US012311943B2

(12) United States Patent
Ito et al.

(10) Patent No.: US 12,311,943 B2
(45) Date of Patent: May 27, 2025

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicant: TOYOTA JIDOSHA KABUSHIKI KAISHA, Toyota (JP)

(72) Inventors: Tatsuya Ito, Toyota (JP); Hideki Kamatani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/155,370

(22) Filed: Jan. 17, 2023

(65) Prior Publication Data

US 2023/0234587 A1 Jul. 27, 2023

(30) Foreign Application Priority Data

Jan. 27, 2022 (JP) ................. 2022-010818

(51) Int. Cl.
*B60W 30/00* (2006.01)
*B60W 30/14* (2006.01)
(Continued)

(52) U.S. Cl.
CPC ........ *B60W 30/165* (2013.01); *B60W 30/143* (2013.01); *B60W 30/18072* (2013.01);
(Continued)

(58) Field of Classification Search
CPC ............. B60W 30/165; B60W 30/143; B60W 30/18072; B60W 40/02; B60W 2510/244;
(Continued)

(56) References Cited

U.S. PATENT DOCUMENTS 8,355,851 B2 1/2013 Inoue et al.
8,370,040 B2 2/2013 Inoue et al.
(Continued)

FOREIGN PATENT DOCUMENTS

DE 10 2016 012 411 A1 5/2017
DE 3316064 A1 * 5/2018 ............ B60W 30/16
(Continued)

OTHER PUBLICATIONS

Z. Liu et al., "A Synchronization Approach for Achieving Cooperative Adaptive Cruise Control Based Non-Stop Intersection Passing," 2020 IEEE International Conference on Robotics and Automation (ICRA), Paris, France, 2020, pp. 236-242, doi: 10.1109/ICRA40945.2020.9196991. (Year: 2020).*

(Continued)

*Primary Examiner* — Russell Frejd
*Assistant Examiner* — Brittany Renee Peko
(74) *Attorney, Agent, or Firm* — Sughrue Mion, PLLC

(57) ABSTRACT

A vehicle driving assistance apparatus predicts (i) a first consumed energy amount corresponding to a consumed energy amount consumed by a driving apparatus of an own vehicle when executing a first following control and (ii) a second consumed energy amount corresponding to the consumed energy amount consumed by the driving apparatus of the own vehicle when executing the second following control. The apparatus executes the second following control when the second consumed energy amount is smaller than the first consumed energy amount. On the other hand, the apparatus executes the first following control when the second consumed energy amount is equal to or greater than the first consumed energy amount.

9 Claims, 17 Drawing Sheets

(51) Int. Cl.
*B60W 30/165* (2020.01)
*B60W 30/18* (2012.01)
*B60W 40/02* (2006.01)

(52) U.S. Cl.
CPC ....... *B60W 40/02* (2013.01); *B60W 2510/244* (2013.01); *B60W 2554/802* (2020.02); *B60W 2555/20* (2020.02)

(58) Field of Classification Search
CPC ....... B60W 2554/802; B60W 2555/20; B60W 2540/215; B60W 2556/65; B60W 2554/402; B60W 60/0023; B60W 2554/4023; B60W 2554/4042; B60W 2554/406; B60W 2720/10; B60W 2720/103; B60W 2720/106; B60W 30/162; B60W 2754/30; B60W 30/182; B60W 40/1005; B60W 50/0097; B60W 30/16; B60W 40/00; B60W 40/105; B60W 40/107; B60W 2530/13; B60K 2031/0025; B60K 2031/0033; B60K 31/0008
See application file for complete search history.

(56) References Cited

U.S. PATENT DOCUMENTS

| | | | |
|---|---|---|---|
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2010/0324795 A1* | 12/2010 | Tsumori | G06F 19/00 701/70 |
| 2016/0054735 A1* | 2/2016 | Switkes | G05D 1/0293 |
| 2017/0001639 A1 | 1/2017 | Dempsey et al. | |
| 2018/0001764 A1* | 1/2018 | Bang | B60K 31/0008 |
| 2018/0190119 A1* | 7/2018 | Miller, Jr | G08G 1/166 |
| 2019/0295419 A1 | 9/2019 | Tosa et al. | |
| 2020/0031349 A1* | 1/2020 | Jia | B60W 30/16 |
| 2020/0276972 A1* | 9/2020 | Ito | B60W 30/146 |
| 2020/0324766 A1* | 10/2020 | Zhao | B60W 30/16 |
| 2021/0041893 A1* | 2/2021 | Matsumoto | G05D 1/0295 |
| 2021/0316729 A1* | 10/2021 | Sugawara | B60W 30/17 |
| 2024/0034345 A1* | 2/2024 | Kume | B60W 50/14 |

FOREIGN PATENT DOCUMENTS

| | | | | |
|---|---|---|---|---|
| EP | 2 243 675 A1 | 10/2010 | | |
| JP | 4677945 B2 | 4/2011 | | |
| JP | 2020104678 A | * 7/2020 | | B60T 7/12 |
| SE | 1551398 A1 | 5/2017 | | |
| WO | WO2022196679 A1 | * 3/2021 | | B60W 30/16 |

OTHER PUBLICATIONS

Extended European Search Report dated Jun. 26, 2023, in Application No. 23150167.7.

* cited by examiner

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2022-010818 filed on Jan. 27, 2022, the content of which is hereby incorporated by reference in its entirety.

BACKGROUND

Field

The invention relates to a vehicle driving assistance apparatus, a vehicle driving assistance apparatus, and a computer-readable storage medium storing a vehicle driving assistance program.

Description of the Related Art

There is known a vehicle driving assistance apparatus which executes a following control for moving an own vehicle so as to follow a preceding vehicle by autonomously controlling an acceleration and a deceleration of the own vehicle, based on an inter-vehicle distance, i.e., a distance between the own vehicle and the preceding vehicle. As one of the vehicle driving assistance apparatuses, there is also known a vehicle driving assistance apparatus which is configured to set (i) a maximum inter-vehicle distance, i.e., a threshold of the inter-vehicle distance used to determine whether the own vehicle is required to be accelerated and (ii) a minimum inter-vehicle distance, i.e., a threshold of the inter-vehicle distance used to determine whether the own vehicle is required to be decelerated, based on an own vehicle moving speed, i.e., a moving speed of the own vehicle. This known vehicle driving assistance apparatus accelerates the own vehicle when the inter-vehicle distance increases to the maximum inter-vehicle distance and decelerates the own vehicle by coasting the own vehicle when the inter-vehicle distance decreases to the minimum inter-vehicle distance (for example, see JP 4677945 B). Thereby, a fuel consumption while the following control is executed, can be reduced.

With the known vehicle driving assistance apparatus, the own vehicle is coasted from a point of time when the inter-vehicle distance decreases to the minimum inter-vehicle distance to a point of time when the inter-vehicle distance increases to the maximum inter-vehicle distance. That is, the known vehicle driving assistance apparatus tries to reduce the fuel consumption by allowing the own vehicle to be decelerated by coasting the own vehicle until the inter-vehicle distance becomes relatively great.

In this regard, when the inter-vehicle distance is small, an air resistance to the own vehicle is small, and the fuel consumption may be reduced. Thus, if the own vehicle is decelerated by coasting the own vehicle, allowing the inter-vehicle distance to increase to a relatively great distance as the known vehicle driving assistance apparatus does, the own vehicle is coasted for a long time and thereby, the fuel consumption can be reduced. However, the inter-vehicle distance continues to be great for a long time. Thereby, the air resistance to the own vehicle is great and thus, the fuel consumption may be increased. Therefore, in total, the fuel consumption may not be always reduced even by coasting and decelerating the own vehicle, allowing the inter-vehicle distance to increase to the relatively great distance.

As described above, depending on a moving condition of the own vehicle, the total fuel consumption for moving the own vehicle so as to maintain the inter-vehicle distance constant, may be smaller than the total fuel consumption for moving the own vehicle with coasting and decelerating the own vehicle, allowing the inter-vehicle distance to increase to the great distance. In general, depending on the moving condition of the own vehicle, a consumed energy amount of a driving apparatus of the own vehicle (i.e., an amount of energy consumed by the driving apparatus) for moving the own vehicle so as to maintain the inter-vehicle distance constant, may be smaller than the consumed energy amount of the driving apparatus of the own vehicle for moving the own vehicle with coasting and decelerating the own vehicle, allowing the inter-vehicle distance to increase to the great distance.

SUMMARY

An object of the invention is to provide a vehicle driving assistance apparatus, a vehicle driving assistance method, and a computer-readable storage medium storing a vehicle driving assistance program which executes the following control with the small consumed energy amount of the driving apparatus of the own vehicle.

According to the invention, a vehicle driving assistance apparatus comprises an electronic control unit. The electronic control unit is configured to execute a first following control and a second following control. The first following control is a control to move an own vehicle, following a preceding vehicle by autonomously controlling acceleration and deceleration of the own vehicle so as to maintain an inter-vehicle distance between the own vehicle and the preceding vehicle within a first predetermined distance range. The second following control is a control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range.

According to the vehicle driving assistance apparatus, the electronic control unit is configured to predict (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control. Further, the electronic control unit is configured to execute the second following control when the second consumed energy amount is smaller than the first consumed energy amount. Furthermore, the electronic control unit is configured to execute the first following control when the second consumed energy amount is equal to or greater than the first consumed energy amount.

When the own vehicle is moved, following the preceding vehicle, the air resistance to the own vehicle is small. Thus, the consumed energy amount consumed by the driving apparatus of the own vehicle is small. Further, the consumed energy amount consumed by the driving apparatus of the own vehicle is small when the own vehicle is moved by the second following control, compared with when the own vehicle is moved by the first following control without considering the air resistance to the own vehicle. However, when the own vehicle is moved by the second following control, the inter-vehicle distance increases and decreases. As a result, the air resistance to the own vehicle also increases and decreases. Thus, the consumed energy amount consumed by the driving apparatus is not always small when the own vehicle is moved by the second following control, compared with when the own vehicle is moved by the first following control in consideration of the air resistance to the own vehicle.

With the vehicle driving assistance apparatus according to the invention, when the second following control is requested to be executed, the first consumed energy amount (i.e., the consumed energy amount consumed by the driving force when the first following control is executed) and the second consumed energy amount (i.e., the consumed energy amount consumed by the driving force when the second following control is executed), are predicted, and only when the second consumed energy amount is smaller than the first consumed energy amount, the second following control is executed. Thus, the consumed energy amount consumed by the driving apparatus can be reduced.

According to an aspect of the invention, when a predetermined execution condition that the consumed energy amount consumed by the driving apparatus of the own vehicle is requested to be reduced, becomes satisfied, the electronic control unit may be configured to predict changes of the inter-vehicle distance and the own vehicle moving speed as first predicted changes assuming that the first following control is executed. In addition, the electronic control unit may be configured to predict the first consumed energy amount corresponding to the energy amount consumed by the driving apparatus of the own vehicle assuming that the first following control is executed, based on the first predicted changes. In addition, the electronic control unit may be configured to predict the changes of the inter-vehicle distance and the own vehicle moving speed as second predicted changes assuming that the second following control is executed. In addition, the electronic control may be configured to predict the second consumed energy amount corresponding to the consumed energy amount consumed by the driving apparatus of the own vehicle assuming that the second following control is executed, based on the predicted second changes.

With to the vehicle driving assistance apparatus according to this aspect of the invention, when the second following control is requested to be executed, the first and second consumed energy amounts are predicted, and only when the second consumed energy amount is smaller than the first consumed energy amount, the second following control is executed. Thus, the consumed energy amount consumed by the driving apparatus can be reduced.

According to another aspect of the invention, the second following control may be a control to (i) decelerate the own vehicle by coasting the own vehicle when the own vehicle moving speed increases to an upper limit of the predetermined speed range and (ii) accelerate the own vehicle when the own vehicle moving speed decreases to a lower limit of the predetermined speed range. Alternatively, the second following control may be a control to (i) accelerate the own vehicle when the inter-vehicle distance increases to an upper limit of the second predetermined distance range and (ii) decelerate the own vehicle by coasting the own vehicle when the inter-vehicle distance decreases to a lower limit of the second predetermined distance range.

With the vehicle driving assistance apparatus according to this aspect of the invention, when the second following control is executed, the own vehicle is accelerated and decelerated, allowing the own vehicle moving speed to increase and decrease within the predetermined speed range, or the own vehicle is accelerated and decelerated, allowing the inter-vehicle distance to increase and decrease within the second predetermined distance range. Thus, the consumed energy amount of the driving apparatus can be reduced.

According to further another aspect of the invention, the second following control may be a control to (i) accelerate the own vehicle by an optimum acceleration control to accelerate the own vehicle by operating the driving apparatus at an operation state which realizes the smallest consumed energy amount of the driving apparatus or the consumed energy amount close to the smallest consumed energy amount when the own vehicle is required to be accelerated, and (ii) decelerate the own vehicle by a coasting control to coast the own vehicle when the own vehicle is required to be decelerated.

With the vehicle driving assistance apparatus according to this aspect of the invention, when the own vehicle is accelerated, the driving apparatus is operated at the operation state which realizes the smallest consumed energy amount or the consumed energy amount close to the smallest consumed energy amount. In addition, when the own vehicle is decelerated, the own vehicle is coasted. Thus, the consumed energy amount of the driving apparatus can be reduced.

According to further another aspect of the invention, the electronic control unit may be configured to (i) acquire a range of the permitted own vehicle moving speed, depending on an environmental traffic condition on the moving own vehicle and set the acquired range of the own vehicle moving speed as the predetermined speed range, or (ii) acquire a range of the permitted inter-vehicle distance, depending on the environmental traffic condition on the moving own vehicle and set the acquired range of the inter-vehicle distance as the second predetermined distance range.

If the own vehicle moving speed becomes small excessively, or the inter-vehicle distance becomes great excessively when the second following control is executed, it may lead to an undesirable traffic jam. Further, if the own vehicle moving speed becomes great excessively, or the inter-vehicle distance becomes small excessively when the second following control is executed, it may lead to an undesirable situation in a point of view of a moving safety of the own vehicle. In this regard, the range of the permitted own vehicle moving speed and the range of the permitted inter-vehicle distance when the second following control is executed, depend on the environmental traffic condition on the moving own vehicle. With the vehicle driving assistance apparatus according to this aspect of the invention, the predetermined speed range or the second predetermined distance range is set, depending on the environmental traffic condition on the moving own vehicle. Thus, the own vehicle is moved by the second following control in a suitable manner.

According to further another aspect of the invention, the electronic control unit may be configured to (i) predict the inter-vehicle distance and the own vehicle moving speed when executing the first following control, based on a moving speed of the preceding vehicle when executing the first following control, and (ii) predict the inter-vehicle distance and the own vehicle moving speed when executing the second following control, based on the moving speed of the preceding vehicle when executing the second following control.

When the first following control or the second following control is executed, the inter-vehicle distance and the own vehicle moving speed change by an influence of the moving speed of the preceding vehicle. With the vehicle driving assistance apparatus according to this aspect of the invention, the inter-vehicle distance and the own vehicle moving speed when the first following control is executed, is predicted, based on the moving speed of the preceding vehicle when the first following control is executed. In addition, the inter-vehicle distance and the own vehicle moving speed when the second following control is executed, is predicted, based on the moving speed of the preceding vehicle when the second following control is executed. Thus, the inter-vehicle distance and the own vehicle moving speed can be accurately predicted.

According to further another aspect of the invention, the electronic control unit may be configured to predict the first consumed energy amount and the second consumed energy amount in consideration of a size of the preceding vehicle.

The air resistance to the own vehicle changes, depending on the size of the preceding vehicle. With the vehicle driving assistance apparatus according to this aspect of the invention, the first and second consumed energy amounts are predicted in consideration of the size of the preceding vehicle. Thus, the first and second consumed energy amounts can be accurately predicted.

According to further another aspect of the invention, the electronic control unit may be configured to execute a third following control to move the own vehicle, following the preceding vehicle by accelerating and decelerating the own vehicle synchronously or almost synchronously with an acceleration and a deceleration of the preceding vehicle. The third following control may be a control to (i) accelerate the own vehicle by an optimum acceleration control to accelerate the own vehicle by operating the driving apparatus of the own vehicle at an operation state which realizes the smallest consumed energy amount of the driving apparatus of the own vehicle or the consumed energy amount close to the smallest consumed energy amount when the own vehicle is required to be accelerated and (ii) decelerate the own vehicle by a coasting control to coast the own vehicle when the own vehicle is required to be decelerated. Further, the electronic control unit may be configured to execute the third following control when the predetermined execution condition is satisfied, and a synchronous condition is satisfied. The synchronous condition may be a condition that (i) a power output property of a driving apparatus of the preceding vehicle is the same or almost the same as a power output property of the driving apparatus of the own vehicle, and (ii) the preceding vehicle is moved by the same control as the second following control or the third following control. Furthermore, the electronic control unit may be configured to execute the first following control or the second following control when the predetermined execution condition is satisfied, and the synchronous condition is not satisfied.

When the power output property of the driving apparatus of the preceding vehicle is the same or almost the same as the power output property of the driving apparatus of the own vehicle, and the preceding vehicle is moved by the same control as the third following control, the consumed energy amount of the driving apparatus of the own vehicle for moving the own vehicle by the third following control to accelerate and decelerate the own vehicle synchronously or almost synchronously with the acceleration and the deceleration of the preceding vehicle, is smaller than the consumed energy amount of the driving apparatus of the own vehicle for moving the own vehicle by the first or second following control. With the vehicle driving assistance apparatus according to this aspect of the invention, when the power output property of the driving apparatus of the preceding vehicle is the same or almost the same as the power output property of the driving apparatus of the own vehicle, and the preceding vehicle is moved by the same control as the third following control, the own vehicle is moved by the third following control. Thus, the consumed energy amount of the driving apparatus of the own vehicle can be reduced.

According to further another aspect of the invention, the electronic control unit may be configured to execute a third following control to move the own vehicle, following the preceding vehicle by accelerating and decelerating the own vehicle synchronously or almost synchronously with an acceleration and a deceleration of the preceding vehicle. The third following control may be a control to (i) accelerate the own vehicle by an optimum acceleration control to accelerate the own vehicle by operating the driving apparatus of the own vehicle at an operation state which realizes the smallest consumed energy amount of the driving apparatus or the consumed energy amount close to the smallest consumed energy amount when the own vehicle is required to be accelerated and (ii) decelerate the own vehicle by a coasting control to coast the own vehicle when the own vehicle is required to be decelerated. Further, the electronic control unit may be configured to transfer the own vehicle to behind another vehicle and execute the third following control when (i) the other vehicle including a driving apparatus having the same or almost the same power output property as a power output property of the driving apparatus of the own vehicle, is detected, and (ii) the other vehicle is moved by the same control as the second following control or the third following control.

With the vehicle driving assistance apparatus according to this aspect of the invention, when the other vehicle including the driving apparatus having the same or almost the same power output property as the power output property of the driving apparatus of the own vehicle, is detected, the own vehicle is transferred to behind the other vehicle and moved by the third following control. Thus, the consumed energy amount of the driving apparatus of the own vehicle can be reduced.

Further, a vehicle driving assistance method according to the invention is a method for moving an own vehicle by one of a first following control and a second following control. The first following control is a control to move an own vehicle, following a preceding vehicle by autonomously controlling an acceleration and a deceleration of the own vehicle so as to maintain an inter-vehicle distance between the own vehicle and the preceding vehicle within a first predetermined distance range. The second following control is a control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range.

In addition, the vehicle driving assistance method according to the invention comprises a step of predicting (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control. Further, the vehicle driving assistance method according to the invention comprises a step of executing the second following control when the second consumed energy amount is smaller than the first consumed energy amount. Furthermore, the vehicle driving assistance method according to the invention comprises a step of executing the first following control when the second consumed energy amount is equal to or greater than the first consumed energy amount.

With the vehicle driving assistance method according to the invention, as described above, the consumed energy amount of the driving apparatus can be small.

Furthermore, a computer-readable storage medium according to the invention is a medium storing a vehicle driving assistance program which moves an own vehicle by one of a first following control and a second following control. The first following control is a control to move an own vehicle, following a preceding vehicle by autonomously controlling an acceleration and a deceleration of the own vehicle so as to maintain an inter-vehicle distance between the own vehicle and the preceding vehicle within a first predetermined distance range. The second following control is a control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range.

Further, the vehicle driving assistance program according to the invention is configured to predict (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control. Further, the vehicle driving assistance program according to the invention is configured to execute the second following control when the second consumed energy amount is smaller than the first consumed energy amount. Furthermore, the vehicle driving assistance program according to the invention is configured to execute the first following control when the second consumed energy amount is equal to or greater than the first consumed energy amount.

With the computer-readable storage medium according to the invention, as described above, the consumed energy amount of the driving apparatus can be small.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
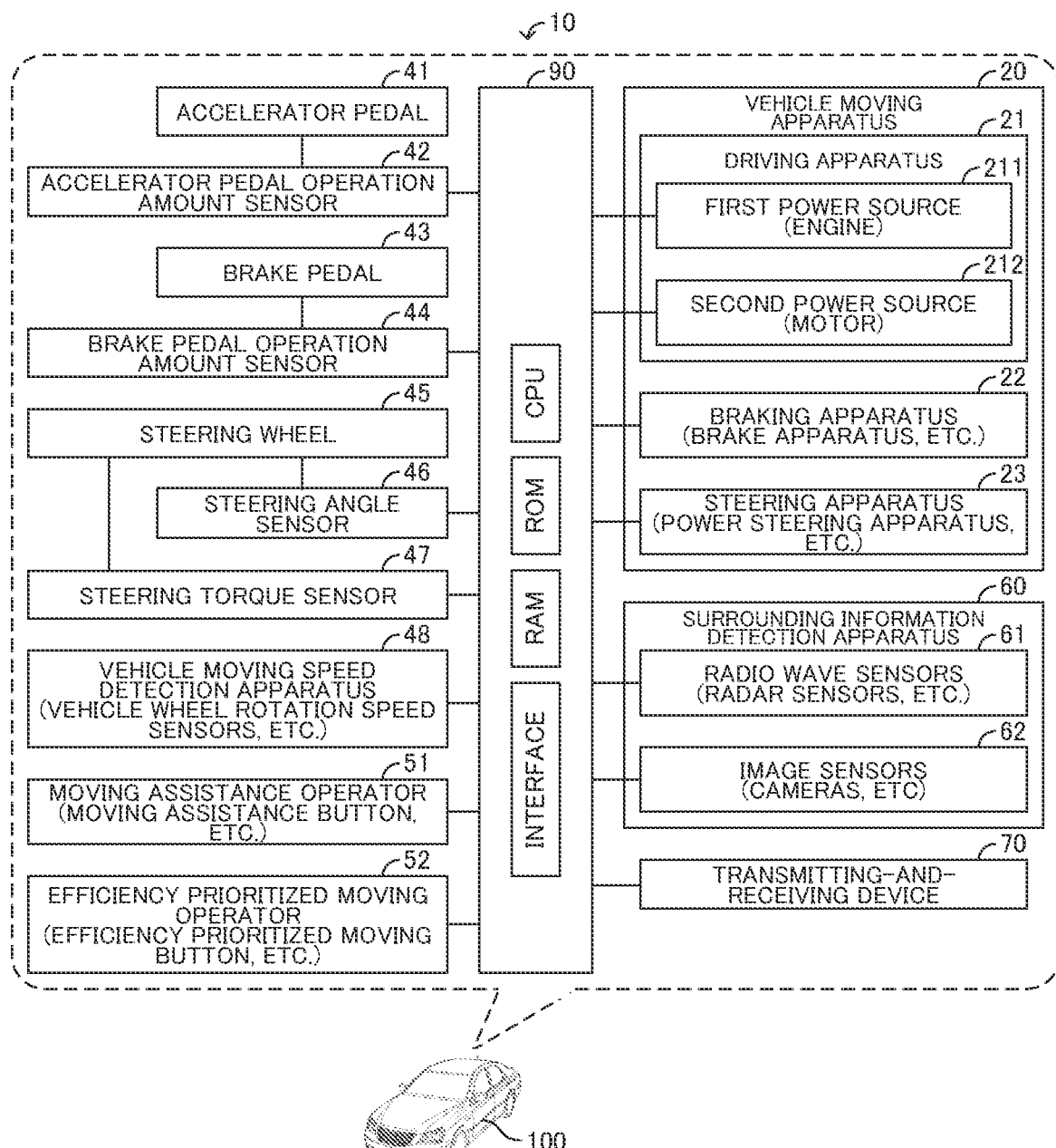
FIG. 1 is a view which shows a vehicle driving assistance apparatus according to an embodiment of the invention and a vehicle or an own vehicle installed with the vehicle driving assistance apparatus.

Below, a vehicle driving assistance apparatus according to an embodiment of the invention will be described with reference to the drawings. The vehicle driving assistance apparatus 10 according to the embodiment of the invention is shown in FIG. 1. The vehicle driving assistance apparatus 10 is installed on an own vehicle 100.

<ECU>

The vehicle driving assistance apparatus 10 includes an ECU 90 as a control unit. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, and routines stored in the ROM. In particular, a vehicle driving assistance program of executing a driving assistance control described later in detail as one of automatic driving controls or autonomous driving controls, is stored in the ROM, and the CPU executes the driving assistance control by executing the vehicle driving assistance program.

In particular, the ECU 90 previously stores a program of executing a moving assistance control described later in detail in the ROM. In this regard, the ECU 90 may be configured to wirelessly acquire and store the program from devices provided outside of the own vehicle 100 via a signal receiving device. In addition, the ECU 90 may be configured to wirelessly update the stored program by the devices provided outside of the own vehicle 100 via the signal receiving device.

<Vehicle Moving Apparatus>

The own vehicle 100 is installed with a vehicle moving apparatus 20. The vehicle moving apparatus 20 is an apparatus which drives, brakes, and steers the own vehicle 100. In this embodiment, the vehicle moving apparatus 20 includes a driving apparatus 21, a braking apparatus 22, and a steering apparatus 23.

<Driving Apparatus>

The driving apparatus 21 is an apparatus which outputs a driving force or a driving torque to be applied to the own vehicle 100 to move the same. In this embodiment, the driving apparatus 21 includes two power sources, i.e., a first power source 211 and a second power source 212. The first power source 211 and the second power source 212 have different power output properties. For example, the first power source 211 is an internal combustion engine, and the second power source 212 is at least one electric motor. The first power source 211 and the second power source 212 are electrically connected to the ECU 90. The ECU 90 controls the driving force or the driving torque output from the first power source 211 and the second power source 212, respectively by controlling operations of the first power source 211 and the second power source 212, respectively.

<Braking Apparatus>

The braking apparatus 22 is an apparatus which outputs a braking force or a braking torque to be applied to the own vehicle 100 to brake the same. The braking apparatus 22 may include a hydraulic brake apparatus. The braking apparatus 22 is electrically connected to the ECU 90. The ECU 90 controls the braking force or the braking torque output from the braking apparatus 22 by controlling operations of the braking apparatus 22.

<Steering Apparatus>

The steering apparatus 23 is an apparatus which outputs a steering force or a steering torque to be applied to the own vehicle 100 to steer the same. The steering apparatus 23 may include a power steering apparatus. The steering apparatus 23 is electrically connected to the ECU 90. The ECU 90 controls the steering force or the steering torque output from the steering apparatus 23 by controlling operations of the steering apparatus 23.

<Sensors, Etc.>

In addition, the own vehicle 100 is installed with an accelerator pedal 41, an accelerator pedal operation amount sensor 42, a brake pedal 43, a brake pedal operation amount sensor 44, a steering wheel 45, a steering angle sensor 46, a steering torque sensor 47, a vehicle moving speed detection apparatus 48, a moving assistance operator 51, an efficiency prioritized moving operator 52, a surrounding information detection apparatus 60, and a transmitting-and-receiving device 70.

<Accelerator Pedal Operation Amount Sensor>

The accelerator pedal operation amount sensor 42 is a sensor which detects an operation amount of the accelerator pedal 41. The accelerator pedal operation amount sensor 42 is electrically connected to the ECU 90. The accelerator pedal operation amount sensor 42 sends information on the detected operation amount to the ECU 90. The ECU 90 acquires the operation amount of the accelerator pedal 41 as an accelerator pedal operation amount AP, based on the information sent from the accelerator pedal operation amount sensor 42.

When the ECU 90 does not execute the moving assistance control described later in detail, the ECU 90 calculates and acquires the driving torque to be output from the driving apparatus 21, based on the accelerator pedal operation amount AP and an own vehicle moving speed V1, i.e., a moving speed of the own vehicle 100. Then, the ECU 90 sets the acquired driving torque as a driver requested driving torque TQ1drv_req. The ECU 90 causes the driving apparatus 21 to output the driving torque corresponding to the driver requested driving torque TQ1drv_req. On the other hand, while the ECU 90 executes the moving assistance control described later in detail, the ECU 90 sets the driving torque necessary to move the own vehicle 100 as desired by the moving assistance control as a system requested driving torque TQ1sys_req. Then, the ECU 90 causes the driving apparatus 21 to output the driving torque corresponding to the system requested driving torque TQ1sys_req.

<Brake Pedal Operation Amount Sensor>

The brake pedal operation amount sensor 44 is a sensor which detects an operation amount of the brake pedal 43. The brake pedal operation amount sensor 44 is electrically connected to the ECU 90. The brake pedal operation amount sensor 44 sends information on the detected operation amount to the ECU 90. The ECU 90 acquires the operation amount of the brake pedal 43 as a brake pedal operation amount BP, based on the information sent from the brake pedal operation amount sensor 44.

When the ECU 90 does not execute the moving assistance control described later in detail, the ECU 90 calculates and acquires the braking torque to be applied to the own vehicle 100 by the braking apparatus 22, based on the brake pedal operation amount BP. Then, the ECU 90 sets the acquired braking torque as a driver requested braking torque TQ2drv_req. The ECU 90 causes the braking apparatus 22 to apply the braking torque corresponding to the driver requested braking torque TQ2drv_req to the own vehicle 100. On the other hand, while the ECU 90 executes the moving assistance control described later in detail, the ECU 90 sets the braking torque necessary to move the own vehicle 100 as desired by the moving assistance control as a system requested braking torque TQ2sys_req. Then, the ECU 90 causes the braking apparatus 22 to apply the braking torque corresponding to the system requested braking torque TQ2sys_req to the own vehicle 100.

<Steering Angle Sensor>

The steering angle sensor 46 is a sensor which detects a rotation angle of the steering wheel 45 with respect to its neutral position. The steering angle sensor 46 is electrically connected to the ECU 90. The steering angle sensor 46 sends information on the detected rotation angle of the steering wheel 45 to the ECU 90. The ECU 90 acquires the rotation angle of the steering wheel 45 as a steering angle θ, based on the information sent from the steering angle sensor 46.

<Steering Torque Sensor>

The steering torque sensor 47 is a sensor which detects a torque input to a steering shaft by an own vehicle driver (i.e., a driver of the own vehicle 100) by the steering wheel 45.

The steering torque sensor 47 is electrically connected to the ECU 90. The steering torque sensor 47 sends information on the detected torque to the ECU 90. The ECU 90 acquires the torque which the own vehicle driver inputs by the steering wheel 45 as a driver input steering torque TQ3drv, based on the information sent from the steering torque sensor 47.

<Vehicle Moving Speed Detection Apparatus>

The vehicle moving speed detection apparatus 48 is a sensor which detects the moving speed of the own vehicle 100. The vehicle moving speed detection apparatus 48 may include vehicle wheel rotation speed sensors. The vehicle moving speed detection apparatus 48 is electrically connected to the ECU 90. The vehicle moving speed detection apparatus 48 sends information on the detected moving speed of the own vehicle 100 to the ECU 90. The ECU 90 acquires the moving speed of the own vehicle 100 as the own vehicle moving speed V1, based on the information sent from the vehicle moving speed detection apparatus 48.

The ECU 90 calculates and acquires the steering torque to be output from the steering apparatus 23, based on the steering angle θ, the driver input steering torque TQ3drv, and the own vehicle moving speed V1. Then, the ECU 90 sets the acquired steering torque as a requested steering torque TQ3req and causes the steering apparatus 23 to output the steering torque corresponding to the requested steering torque TQ3req.

<Moving Assistance Operator>

The moving assistance operator 51 is a device which is operated by the own vehicle driver. The moving assistance operator 51 may include at least one switch or at least one button. The switch or the button may be provided on the steering wheel 45 or a lever provided on a steering column of the own vehicle 100.

In this embodiment, the moving assistance operator 51 includes a moving assistance selection switch, a vehicle moving speed setting switch, a vehicle moving speed increasing button, a vehicle moving speed decreasing button, and an inter-vehicle distance setting button. The moving assistance operator 51 is electrically connected to the ECU 90.

When the moving assistance selection switch is operated while the moving assistance control described later in detail is not executed, a signal is sent from the moving assistance operator 51 to the ECU 90. When the ECU 90 receives the signal in question, the ECU 90 determines that the moving assistance control is requested to be executed.

When the moving assistance selection switch is operated while the moving assistance control is executed, a signal is sent from the moving assistance operator 51 to the ECU 90. When the ECU 90 receives the signal in question, the ECU 90 determines that the moving assistance control is not requested to be executed. In other words, the ECU 90 determines that an execution of the moving assistance control is requested to be terminated.

When the vehicle moving speed setting switch is operated while the moving assistance control is executed, a signal is sent from the moving assistance operator 51 to the ECU 90. When the ECU 90 receives the signal in question, the ECU 90 sets the current own vehicle moving speed V1 as a set speed Vset which is used by the moving assistance control.

When the vehicle moving speed increasing button is operated while the moving assistance control is executed, a signal is sent from the moving assistance operator 51 to the ECU 90. When the ECU 90 receives the signal in question, the ECU 90 increases the set speed Vset. On the other hand, when the vehicle moving speed decreasing button is operated while the moving assistance control is executed, a signal is sent from the moving assistance operator 51 to the ECU 90. When the ECU 90 receives the signal in question, the ECU 90 decreases the set speed Vset.

When the inter-vehicle setting button is operated while the moving assistance control is executed, a signal is sent from the moving assistance operator 51 to the ECU 90. The signal in question is a requested inter-vehicle distance signal which represents a requested inter-vehicle distance Dreq. The requested inter-vehicle distance Dreq is an inter-vehicle distance D requested to be realized by an ordinary following control by the own vehicle driver operating the inter-vehicle distance setting button. The inter-vehicle distance D is a distance between the own vehicle 100 and a preceding vehicle 200F.

Figure 2:
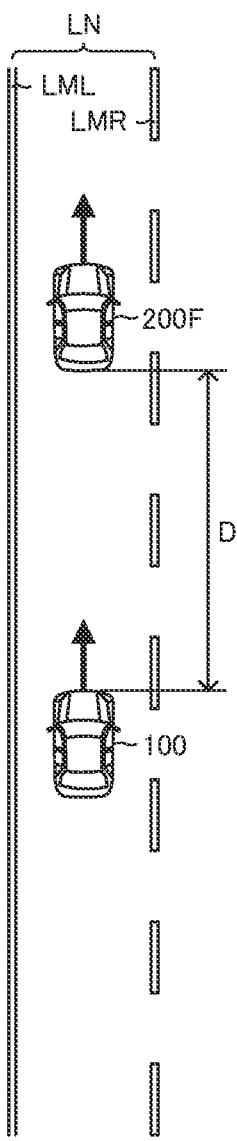
FIG. 2 is a view which shows a forward inter-vehicle distance.

As shown in FIG. 2, the inter-vehicle distance D is a distance between the own vehicle 100 and the preceding vehicle 200F and is acquired, based on surrounding detection information IS described later in detail. In this embodiment, the preceding vehicle 200F is a vehicle which moves ahead of the own vehicle 100 in an own vehicle lane LN and has the inter-vehicle distance D equal to or smaller than a predetermined distance or a preceding vehicle determination distance Dth. The own vehicle lane LN is a traffic lane in which the own vehicle 100 moves. The own vehicle lane LN is recognized, based on information on a left lane marking LML and a right lane marking LMR which are acquired, based on the surrounding detection information IS. Further, in this embodiment, the requested inter-vehicle distance Dreq which the own vehicle driver can select by operating the inter-vehicle distance setting button, includes a long distance Dlong, a middle distance Dmiddle, and a short distance Dshort.

In this embodiment, when the ECU 90 receives the requested inter-vehicle distance signal, the ECU 90 sets a set inter-vehicle distance Dset, based on the current own vehicle moving speed V1 and the requested inter-vehicle distance Dreq. In this regard, the ECU 90 may be configured to set the set inter-vehicle distance Dset, based on the requested inter-vehicle distance Dreq, independently of the current own vehicle moving speed V1.

In particular, the ECU 90 sets the set inter-vehicle distance Dset which corresponds to the inter-vehicle distance D which realizes a predicted reaching time TTC corresponding to a predetermined time or a predetermined predicted reaching time TTCref. The predicted reaching time TTC is acquired by dividing the inter-vehicle distance D by the current own vehicle moving speed V1. That is, the ECU 90 sets the set inter-vehicle distance Dset which corresponds to the inter-vehicle distance D which satisfies a relationship between the current own vehicle moving speed V1, the predetermined predicted reaching time TTCref, and the inter-vehicle distance D represented by a formula 1 below.

$$TTCref = D/V1 \qquad (1)$$

When the requested inter-vehicle distance Dreq is the long distance Dlong, a longer time is set as the predetermined predicted reaching time TTCref. When the requested inter-vehicle distance Dreq is the middle distance Dmiddle, a middle time is set as the predetermined predicted reaching time TTCref. When the requested inter-vehicle distance Dreq is the short distance Dshort, a shorter time is set as the predetermined predicted reaching time TTCref. It should be noted that the preceding vehicle determination distance Dth is greater than the set inter-vehicle distance Dset.

<Efficiency Prioritized Moving Operator>

The efficiency prioritized moving operator 52 is a device which is operated by the own vehicle driver. The efficiency prioritized moving operator 52 may include at least one switch or at least one button. The switch or the button may be provided on the steering wheel 45 of the own vehicle 100 or the lever provided on the steering column of the own vehicle 100.

When the efficiency prioritized moving operator 52 in an OFF position is operated, a position of the efficiency prioritized moving operator 52 turns to an ON position. When the position of the efficiency prioritized moving operator 52 turns to the ON position, the efficiency prioritized moving operator 52 sends a signal to the ECU 90. When the ECU 90 receives the signal in question, the ECU 90 determines that an efficiency prioritized assistance control described later in detail is requested to be executed.

On the other hand, when the efficiency prioritized moving operator 52 in the ON position is operated, the position of the efficiency prioritized moving operator 52 turns to the OFF position. When the position of the efficiency prioritized moving operator 52 turns to the OFF position, the efficiency prioritized moving operator 52 sends a signal to the ECU 90. When the ECU 90 receives the signal in question, the ECU 90 determines that the efficiency prioritized assistance control is not requested to be executed.

<Surrounding Information Detection Apparatus>

The surrounding information detection apparatus 60 is an apparatus which detects information on surroundings of the own vehicle 100. In this embodiment, the surrounding information detection apparatus 60 includes radio wave sensors 61 and image sensors 62.

<Radio Wave Sensors>

The radio wave sensor 61 is a sensor which detects information on objects around the own vehicle 100 by using radio waves. The radio wave sensor 61 may include a radar sensor such as a millimeter wave radar, or a sonic sensor such as an ultrasonic sensor such as a clearance sonar, or an optical sensor such as a laser radar such as a LiDAR. The radio wave sensors 61 are electrically connected to the ECU 90. The radio wave sensor 61 transmits the radio waves and receives reflected waves, i.e., the radio waves reflected by the objects. The radio wave sensor 61 sends information on the transmitted radio waves and the received reflected waves to the ECU 90. In other words, the radio wave sensor 61 detects the objects around the own vehicle 100 and sends the information on the detected objects to the ECU 90. The ECU 90 acquires the information on the objects around the own vehicle 100 as the surrounding detection information IS, based on the information including radio wave information or radio wave data sent from the radio wave sensors 61. The objects detected by the radio wave sensors 61 may include vehicles, walls, bicycles, and persons.

<Image Sensors>

The image sensor 62 is a sensor which takes images of views around the own vehicle 100. The image sensor 62 may be a camera. The image sensors 62 are electrically connected to the ECU 90. The image sensors 62 take the images of the views around the own vehicle 100 and send information on the taken images to the ECU 90. The ECU 90 acquires information on the surroundings of the own vehicle 100 as the surrounding detection information IS, based on the information including image information or image data sent from the image sensors 62.

The ECU 90 acquires the inter-vehicle distance D between the preceding vehicle 200F and the own vehicle 100 and a preceding vehicle moving speed V2, i.e., a moving speed of the preceding vehicle 200F, based on the surrounding detection information IS.

<Transmitting-and-Receiving Device>

Figure 3:
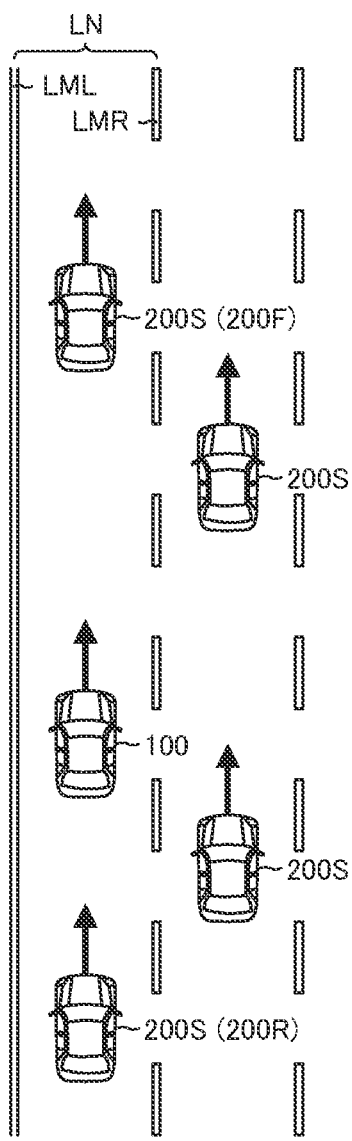
FIG. 3 is a view which shows surrounding vehicles, i.e., vehicles around the own vehicle.

The transmitting-and-receiving device 70 receives wireless signals transmitted from surrounding vehicles 200S (i.e., vehicles around the own vehicle 100 as shown in FIG. 3) and transmits wireless signals to outside of the own vehicle 100. The transmitting-and-receiving device 70 is electrically connected to the ECU 90. The ECU 90 acquires the wireless signals transmitted from the surrounding vehicles 200S by the transmitting-and-receiving device 70 and transmits the wireless signals to the outside of the own vehicle 100 by the transmitting-and-receiving device 70. The ECU 90 acquires information on the surrounding vehicles 200S as vehicle-to-vehicle communication information IV, based on the wireless signals transmitted from the surrounding vehicle 200S.

<Operations of Vehicle Driving Assistance Apparatus>

Next, operations of the vehicle driving assistance apparatus 10 will be described. The vehicle driving assistance apparatus 10 is configured to execute the moving assistance control. The moving assistance control is a control to move the own vehicle 100 by autonomously accelerating and decelerating the own vehicle 100 without the own vehicle driver operating the accelerator pedal 41 or the brake pedal 43. In this embodiment, the moving assistance control includes two kinds of controls, i.e., an ordinary assistance control and the efficiency prioritized assistance control.

<Ordinary Assistance Control>

The ordinary assistance control includes two kinds of controls, i.e., an ordinary following control (or a first following control) and an ordinary constant speed control. In this embodiment, the ordinary following control is a control to autonomously accelerate and decelerate the own vehicle 100 so as to maintain the inter-vehicle distance D at a predetermined distance, i.e., the set inter-vehicle distance Dset. In this regard, the ordinary assistance control may be a control to autonomously accelerate and decelerate the own vehicle 100 so as to maintain the inter-vehicle distance D within a predetermined range, i.e., a first predetermined distance range. The first predetermined distance range is a range which has an upper limit value greater than the set inter-vehicle distance Dset by a predetermined value and a lower limit value smaller than the set inter-vehicle distance Dset by a predetermined value. On the other hand, the ordinary constant speed control is a control to autonomously accelerate and decelerate the own vehicle 100 so as to maintain the own vehicle moving speed V1 at the set speed Vset.

<Efficiency Prioritized Assistance Control>

The efficiency prioritized assistance control is a control to autonomously accelerate the own vehicle 100 by an optimum acceleration control when the own vehicle 100 is required to be accelerated and autonomously decelerate the own vehicle 100 by a coasting control when the own vehicle 100 is required to be decelerated. In this embodiment, the efficiency prioritized assistance control includes three kinds of controls, i.e., a synchronous operation state switching following control (or a synchronous switching following control or a third following control), a non-synchronous operation state switching following control (or a non-synchronous switching following control or a second following control), and an operation state switching constant speed control (or a switching constant speed control).

<Optimum Acceleration Control>

The optimum acceleration control is a control to autonomously accelerate the own vehicle 100 by calculating and acquiring an optimum driving torque, setting the acquired optimum driving torque as a system requested driving torque TQ1sys_req, and causing the driving apparatus 21 to output the driving torque corresponding to the system requested driving torque TQ1sys_req. The optimum driving torque is the driving torque which realizes a greatest energy efficiency of the driving apparatus 21 or an energy efficiency of the driving apparatus 21 close to the greatest energy efficiency, depending on the current own vehicle moving speed V1. In other words, the optimum driving torque is the driving torque which realizes a smallest consumed energy amount of the driving apparatus 21 or a consumed energy amount of the driving apparatus 21 close to the smallest consumed energy amount.

Figure 4:
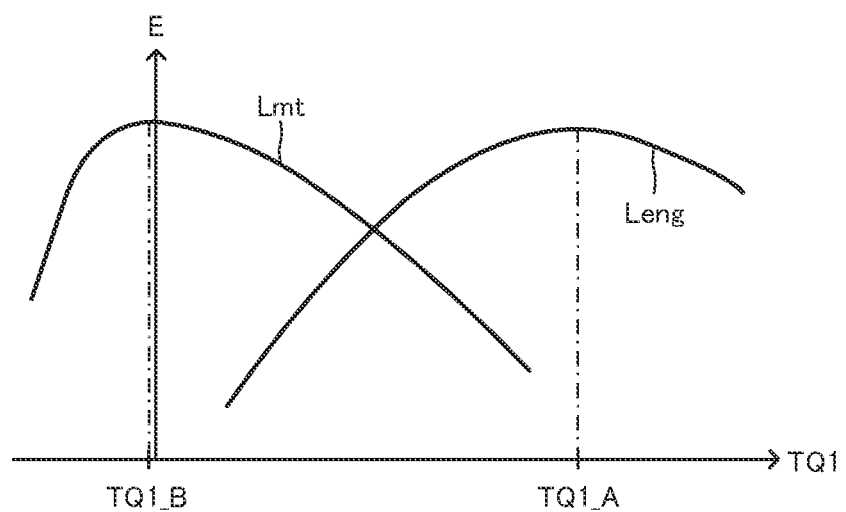
FIG. 4 is a view which shows an energy efficiency of an internal combustion engine, an energy efficiency of an electric motor, and a driving torque.

In this embodiment, the driving apparatus 21 includes the first power source 211 and the second power source 212. As described above, the first power source 211 and the second power source 212 have the different power output properties. The power output properties are properties of the energy efficiency of outputting the driving force. In this embodiment, the first power source 211 and the second power source 212 have the power output properties shown in FIG. 4. As shown by a line Leng, the energy efficiency E of the first power source 211 takes the greatest value when the driving torque TQ1 output from the first power source 211 is a specific value TQ1_A. On the other hand, as shown by a line Lmt, the energy efficiency E of the second power source 212 takes the greatest value when the driving torque TQ1 output from the second power source 212 is a specific value TQ1_B smaller than the value TQ1_A.

In this regard, when the first power source 211 is the internal combustion engine, the energy efficiency of the first power source 211 corresponds to a fuel consumption of the internal combustion engine. The energy efficiency of the first power source 211 increases as the fuel consumption of the internal combustion engine decreases. Further, when the second power source 212 is the electric motor, the energy efficiency of the second power source 212 corresponds to an electricity consumption of the electric motor. The energy efficiency of the second power source 212 increases as the electricity consumption of the electric motor decreases.

As described above, the energy efficiency of the driving apparatus 21 has a property of having a plurality of peak values, in this embodiment, two peak values, and having the greatest value when the driving torque output from the driving apparatus 21 is a specific value, i.e., an optimum driving torque. Thus, the greater energy efficiency of the driving apparatus 21 can be realized by accelerating the own vehicle 100 by causing the driving apparatus 21 to output the driving torque corresponding to the optimum driving torque. Thus, a smaller consumed energy amount of the driving apparatus 21, i.e., a smaller amount of energy consumed by the driving apparatus 21 can be realized.

As described above, the optimum acceleration control is a control to autonomously accelerate the own vehicle 100 by causing the driving apparatus 21 to output the driving torque corresponding to the optimum driving torque. In other words, the optimum acceleration control is a control to autonomously accelerate the own vehicle 100 by operating the driving apparatus 21 with the smallest consumed energy amount.

It should be noted that the optimum acceleration control may be a control to autonomously accelerate the own vehicle 100 by calculating and acquiring the driving torque slightly greater or smaller than the optimum driving torque, setting the acquired driving torque as the system requested driving torque TQ1sys_req, and causing the driving apparatus 21 to output the driving torque corresponding to the set system requested driving torque TQ1sys_req. That is, the optimum acceleration control may be a control to autonomously accelerate the own vehicle 100 by operating the driving apparatus 21 with an optimum consumed energy amount including the smallest consumed energy amount and the consumed energy amount slightly greater than the smallest consumed energy amount. That is, the optimum acceleration control may be a control to autonomously accelerate the own vehicle 100 by operating the driving apparatus 21 so as to maintain the consumed energy amount of the driving apparatus 21 at a predetermined amount or less.

<Coasting Control>

The coasting control is a control to coast the own vehicle 100 by causing the driving apparatus 21 to output the driving torque which does not accelerate nor decelerate the own vehicle 100. In this embodiment, the coasting control is a control to coast the own vehicle 100 by stopping operating the first power source 211 (e.g., the internal combustion engine) and causing the second power source 212 to output the driving torque so as to realize the greatest energy efficiency of the second power source 212 (e.g., the electric motor). Thereby, the own vehicle 100 is decelerated mainly by its moving resistance.

<Synchronous Switching Following Control or Third Following Control>

The synchronous switching following control is a control to autonomously accelerate and decelerate the own vehicle 100 by the optimum acceleration control and the coasting control, respectively so as to move the own vehicle 100, following the preceding vehicle 200F which is a synchronous target vehicle 200E synchronously or almost synchronously with an acceleration and a deceleration of the preceding vehicle 200F, respectively. The preceding vehicle 200F which is the synchronous target vehicle 200E is a vehicle which is moved by the same efficiency prioritized assistance control (i.e., the control to accelerate and decelerate the vehicle by the optimum acceleration control and the coasting control, respectively) as the efficiency prioritized assistance control of this embodiment.

The synchronous target vehicle 200E is the surrounding vehicle 200S, i.e., a vehicle around the own vehicle 100 which is installed with a driving apparatus having the same or almost the same power output property as the power output property of the driving apparatus 21 of the own vehicle 100.

It should be noted that the vehicle-to-vehicle communication information IV includes information on the control which is being executed to control the operations of the driving apparatus of the surrounding vehicle 200S. Thus, the vehicle driving assistance apparatus 10 determines whether the surrounding vehicle 200S is moved by the efficiency prioritized assistance control, based on the vehicle-to-vehicle communication information IV.

Further, in this embodiment, the vehicle-to-vehicle communication information IV includes information on the power output property of the driving apparatus of the surrounding vehicle 200S. Thus, the vehicle driving assistance apparatus 10 determines whether a difference in optimum driving torque between the driving apparatus of the surrounding vehicle 200S and the driving apparatus 21 of the own vehicle 100, is equal to or smaller than a predetermined value, based on the vehicle-to-vehicle communication information IV. In this embodiment, the vehicle driving assistance apparatus 10 determines whether the power output property of the driving apparatus of the surrounding vehicle 200S is the same or almost the same power output property of the driving apparatus 21 of the own vehicle 100.

In this regard, the vehicle-to-vehicle communication information IV may not include the information on the control which is being executed to control the operations of the driving apparatus of the surrounding vehicle 200S. In this case, the vehicle driving assistance apparatus 10 acquires the driving torque of the surrounding vehicle 200S (i.e., the driving torque output from the driving apparatus of the surrounding vehicle 200S), based on the surrounding detection information IS, and determines whether the surrounding vehicle 200S is moved by the efficiency prioritized assistance control, based on the acquired driving torque.

In particular, the vehicle driving assistance apparatus 10 acquires peak acceleration values of the surrounding vehicle 200S (i.e., peak values of the acceleration of the surrounding vehicle 200S), based on the surrounding detection information IS and determines that the surrounding vehicle 200S is moved by the efficiency prioritized assistance control when there are two peak acceleration values of the surrounding vehicle 200S.

Further, the vehicle-to-vehicle communication information IV may not include information on the power output property of the driving apparatus of the surrounding vehicle 200S. In this case, the vehicle driving assistance apparatus 10 acquires the driving torque of the surrounding vehicle 200S, based on the surrounding detection information IS and determines whether a difference in optimum driving torque between the surrounding vehicle 200S and the own vehicle 100 is equal to or smaller than the predetermined value, based on the acquired driving torque of the surrounding vehicle 200S. That is, the vehicle driving assistance apparatus 10 determines whether the power output property of the driving apparatus of the surrounding vehicle 200S is the same or almost the same as the power output property of the driving apparatus 21 of the own vehicle 100, based on the acquired driving torque of the surrounding vehicle 200S.

In particular, the vehicle driving assistance apparatus 10 acquires the peak acceleration values of the surrounding vehicle 200S, based on the surrounding detection information IS and determines that the difference in optimum driving torque between the driving apparatus of the surrounding vehicle 200S and the driving apparatus 21 of the own vehicle 100 is equal to or smaller than the predetermined value when a difference between the acquired peak acceleration value of the surrounding vehicle 200S and a peak acceleration value of the own vehicle 100 (i.e., a value of the acceleration of the own vehicle 100 by the driving apparatus 21), is equal to or smaller than a predetermined value. That is, the vehicle driving assistance apparatus 10 determines that the power output property of the driving apparatus of the surrounding vehicle 200S is the same or almost the same as the power output property of the driving apparatus 21 of the own vehicle 100.

In this embodiment, the vehicle driving assistance apparatus 10 acquires the peak acceleration value of the surrounding vehicle 200S, based on the surrounding detection information IS. When the difference between the acquired peak acceleration value of the surrounding vehicle 200S and the peak acceleration value of the own vehicle 100 is zero, the vehicle driving assistance apparatus 10 determines that the power output property of the driving apparatus of the surrounding vehicle 200S is the same as the power output property of the driving apparatus 21 of the own vehicle 100. When the difference between the acquired peak acceleration value of the surrounding vehicle 200S and the peak acceleration value of the own vehicle 100 is greater than zero, but is equal to or smaller than the predetermined value, the vehicle driving assistance apparatus 10 determines that the power output property of the driving apparatus of the surrounding vehicle 200S is almost the same as the power output property of the driving apparatus 21 of the own vehicle 100.

<Non-Synchronous Switching Following Control or Second Following Control>

The non-synchronous switching following control is a control to autonomously accelerate and decelerate the own vehicle 100 by the optimum acceleration control and the coasting control, respectively at predetermined timings so as to follow the preceding vehicle 200F which is not the synchronous target vehicle 200E or is the synchronous target vehicle 200E but is not moved by the efficiency prioritized assistance control.

<Switching Constant Speed Control>

The switching constant speed control is a control to autonomously accelerate and decelerate by the optimum acceleration control and the coasting control, respectively at predetermined timings so as to maintain the own vehicle moving speed V1 within a predetermined speed range.

<Specific Operations of Vehicle Driving Assistance Apparatus>

Below, various controls such as the ordinary assistance control and the efficiency prioritized assistance control executed by the vehicle driving assistance apparatus 10, will be described in detail with reference to routines shown in FIG. 5 to FIG. 14.

Figure 5:
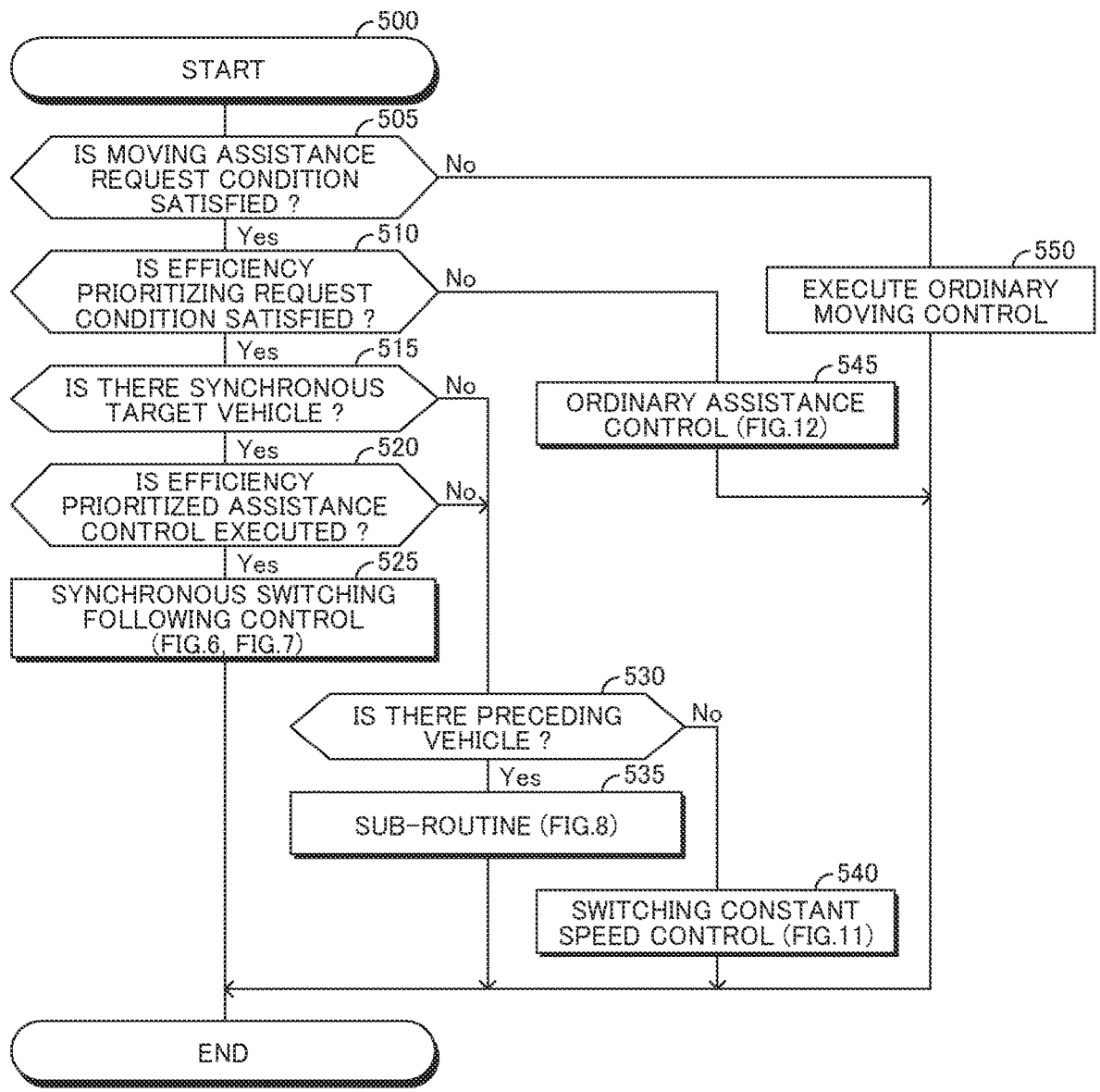
FIG. 5 is a view which shows a flowchart of a routine executed by the vehicle driving assistance apparatus according to the embodiment of the invention.

The vehicle driving assistance apparatus 10 is configured to execute a routine shown in FIG. 5 with a predetermined calculation cycle. Thus, at a predetermined timing, the vehicle driving assistance apparatus 10 starts a process from a step 500 of the routine shown in FIG. 5 and proceeds with the process to a step 505.

The vehicle driving assistance apparatus 10 executes the moving assistance control when a moving assistance request condition C1 is satisfied. On the other hand, when the moving assistance request condition C1 is not satisfied, the vehicle driving assistance apparatus 10 executes an ordinary moving control. Accordingly, when the vehicle driving assistance apparatus 10 proceeds with the process to the step 505, the vehicle driving assistance apparatus 10 determines whether the moving assistance request condition C1 is satisfied.

In this embodiment, when the vehicle driving assistance apparatus 10 determines that the moving assistance control is requested to be executed by the moving assistance operator 51 being operated, and the accelerator pedal 41 and the brake pedal 43 are not operated, the vehicle driving assistance apparatus 10 determines that the moving assistance request condition C1 is satisfied. In this regard, the vehicle driving assistance apparatus 10 may be configured to determine that the moving assistance request condition C1 is satisfied, independently of whether the accelerator pedal 41 and the brake pedal 43 are operated when the moving assistance control is requested to be executed.

It should be noted that the vehicle driving assistance apparatus 10 determines that the moving assistance request condition C1 is unsatisfied, that is, a moving assistance termination condition (i.e., a condition for terminating executing the moving assistance control) is satisfied when the execution of the moving assistance control is requested to be terminated by the moving assistance operator 51 being operated while the moving assistance control is executed. Further, when the brake pedal 43 is operated, that is, the brake pedal operation amount BP becomes greater than zero while the moving assistance control is executed, the vehicle driving assistance apparatus 10 determines that the moving assistance request condition C1 becomes unsatisfied, that is, the moving assistance termination condition becomes satisfied. When the moving assistance request condition C1 becomes unsatisfied, the vehicle driving assistance apparatus 10 terminates executing the moving assistance control and starts to execute the ordinary moving control described later in detail.

When the moving assistance request condition C1 is not satisfied, the vehicle driving assistance apparatus 10 determines "No" at the step 505 and proceeds with the process to a step 550 to execute the ordinary moving control. Then, the vehicle driving assistance apparatus 10 terminates executing the process of this routine once.

The ordinary moving control is a control to (i) calculate and acquire the driving torque to be output from the driving apparatus 21, based on the accelerator pedal operation amount AP and the own vehicle moving speed V1, set the acquired driving torque as the driver requested driving torque TQ1drv_req, and causing the driving apparatus 21 to output the driving torque corresponding to the set driver request driving torque TQ1drv_req, and (ii) calculate and acquire the braking torque to be applied to the own vehicle 100 from the braking apparatus 22, based on the brake pedal operation amount BP, set the acquired braking torque as the driver requested braking torque TQ2drv_req, and causing the braking apparatus 22 to apply the braking torque corresponding to the set driver request braking torque TQ2drv_req to the own vehicle 100.

In this regard, the vehicle driving assistance apparatus 10 is configured to (i) cause the driving apparatus 21 to output the driving torque corresponding to the driver requested driving torque TQ1drv_req by causing the first power source 211 and the second power source 212 to output the driving torque when the driver requested driving torque TQ1drv_req is greater than an operation switching threshold TQ1th greater than zero while executing the ordinary moving control, and (ii) cause the driving apparatus 21 to output the driving torque corresponding to the driver requested driving torque TQ1drv_req by stopping the operations of the first power source 211 and causing the second power source 212 to output the driving torque when the driver requested driving torque TQ1drv_req is equal to or smaller than the operation switching threshold TQ1th.

On the other hand, when the moving assistance request condition C1 is satisfied, the vehicle driving assistance apparatus 10 determines "Yes" at the step 505 and proceeds with the process to a step 510.

The vehicle driving assistance apparatus 10 executes the efficiency prioritized assistance control when an efficiency prioritizing request condition C2 is satisfied. On the other hand, when the efficiency prioritizing request condition C2 is not satisfied, the vehicle driving assistance apparatus 10 executes the ordinary assistance control. Accordingly, when the vehicle driving assistance apparatus 10 proceeds with the process to the step 510, the vehicle driving assistance apparatus 10 determines whether the efficiency prioritizing request condition C2 is satisfied. The vehicle driving assistance apparatus 10 determines that the efficiency prioritizing request condition C2 is satisfied when the efficiency prioritized assistance control is requested to be executed by the efficiency prioritized moving operator 52 being operated.

Figure 12:
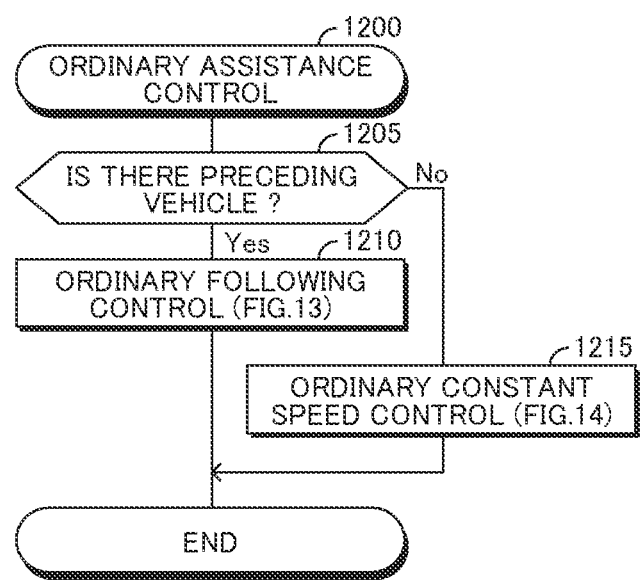
FIG. 12 is a view which shows a flowchart of a routine executed by the vehicle driving assistance apparatus according to the embodiment of the invention.

When the efficiency prioritizing request condition C2 is not satisfied, the vehicle driving assistance apparatus 10 determines "No" at the step 510 and proceeds with the process to a step 545 to execute the ordinary assistance control by executing the routine shown in FIG. 12. Thus, when the vehicle driving assistance apparatus 10 proceeds with the process to the step 545, the vehicle driving assistance apparatus 10 starts a process from a step 1200 of the routine shown in FIG. 12 and proceeds with the process to a step 1205.

When there is the preceding vehicle 200F, the vehicle driving assistance apparatus 10 executes the ordinary following control as the ordinary assistance control. On the other hand, when there is not the preceding vehicle 200F, the vehicle driving assistance apparatus 10 executes the ordinary constant speed control as the ordinary assistance control. Accordingly, when the vehicle driving assistance apparatus 10 proceeds with the process to the step 1205, the vehicle driving assistance apparatus 10 determines whether there is the preceding vehicle 200F.

Figure 13:
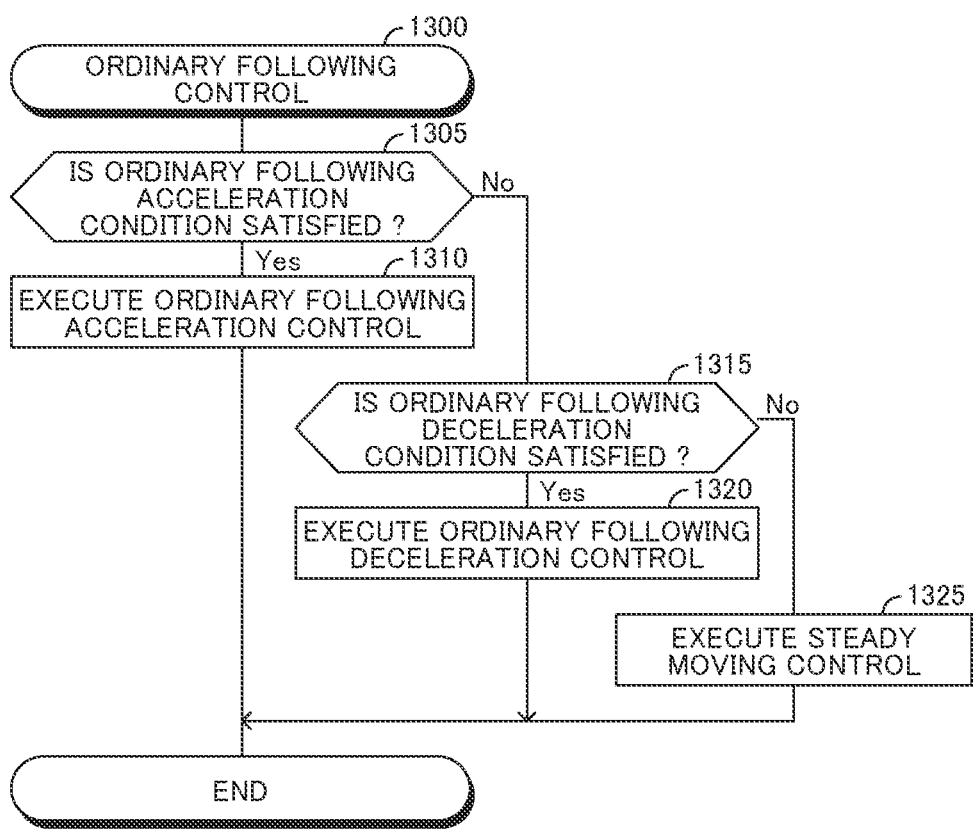
FIG. 13 is a view which shows a flowchart of a routine executed by the vehicle driving assistance apparatus according to the embodiment of the invention.

When there is the preceding vehicle 200F, the vehicle driving assistance apparatus 10 determines "Yes" at the step 1205 and proceeds with the process to a step 1210 to execute the ordinary following control by executing the routine shown in FIG. 13. Thus, when the vehicle driving assistance apparatus 10 proceeds with the process to the step 1210, the vehicle driving assistance apparatus 10 starts a process from a step 1300 of the routine shown in FIG. 13 and proceeds with the process to a step 1305.

As described above, the ordinary following control is a control to autonomously accelerate and decelerate the own vehicle 100 so as to maintain the inter-vehicle distance D at the set inter-vehicle distance Dset. In particular, in this embodiment, the ordinary following control is a control to autonomously accelerate and decelerate the own vehicle 100 so as to maintain the predicted reaching time TTC at the predetermined predicted reaching time TTCref. Thus, when the predicted reaching time TTC becomes greater than the predetermined predicted reaching time TTCref (i.e., an ordinary following acceleration condition C3 becomes satisfied), the vehicle driving assistance apparatus 10 accelerates the own vehicle 100. On the other hand, when the predicted reaching time TTC becomes smaller than the predetermined predicted reaching time TTCref (i.e., an ordinary following deceleration condition C4 becomes satisfied), the vehicle driving assistance apparatus 10 decelerates the own vehicle 100.

Accordingly, when the vehicle driving assistance apparatus 10 proceeds with the process to the step 1305, the vehicle driving assistance apparatus 10 determines whether the ordinary following acceleration condition C3 is satisfied. When the ordinary following acceleration condition C3 is satisfied, the vehicle driving assistance apparatus 10 determines "Yes" at the step 1305 and proceeds with the process to a step 1310 to execute an ordinary following acceleration control.

The ordinary following acceleration control is a control to (i) calculate and acquire the driving torque to be output from the driving apparatus 21 so as to maintain the predicted reaching time TTC at the predetermined predicted reaching time TTCref, (ii) set the acquired driving torque as the system requested driving torque TQ1sys_req, and (iii) cause the driving apparatus 21 to output the driving torque corresponding to the set system request driving torque TQ1sys_req.

After the vehicle driving assistance apparatus 10 executes a process of the step 1310, the vehicle driving assistance apparatus 10 terminates executing this routine once.

On the other hand, when the ordinary following acceleration condition C3 is not satisfied, the vehicle driving assistance apparatus 10 determines "No" at the step 1305 and proceeds with the process to a step 1315 to determine whether the ordinary following deceleration condition C4 is satisfied. When the ordinary following deceleration condition C4 is satisfied, the vehicle driving assistance apparatus 10 determines "Yes" at the step 1315 and proceeds with the process to a step 1320 to execute an ordinary following deceleration control.

The ordinary following deceleration control is a control to (i) calculate and acquire the driving torque to be output from the driving apparatus 21 so as to maintain the predicted reaching time TTC at the predetermined predicted reaching time TTCref and set the acquired driving torque as the system requested driving torque TQ1sys_req, (ii) calculate and acquire the braking torque to be applied to the own vehicle 100 by the braking apparatus 22 so as to maintain the predicted reaching time TTC at the predetermined predicted reaching time TTCref and set the acquired braking torque as the system requested braking torque TQ2sys_req, and (iii) cause the driving apparatus 21 to output the driving torque corresponding to the set system request driving torque TQ1sys_req and cause the braking apparatus 22 to apply the braking torque corresponding to the set system request braking torque TQ2sys_req to the own vehicle 100.

After the vehicle driving assistance apparatus 10 executes a process of the step 1320, the vehicle driving assistance apparatus 10 terminates executing this routine once.

On the other hand, when the ordinary following deceleration condition C4 is not satisfied, the vehicle driving assistance apparatus 10 determines "No" at the step 1315 and proceeds with the process to a step 1325 to execute a steady moving control.

The steady moving control is a control to (i) calculate and acquire the driving torque so as to maintain the current own vehicle moving speed V1, (ii) set the acquired driving torque as the system requested driving torque TQ1sys_req, and (iii) cause the driving apparatus 21 to output the driving torque corresponding to the set system request driving torque TQ1sys_req.

After the vehicle driving assistance apparatus 10 executes a process of the step 1325, the vehicle driving assistance apparatus 10 terminates executing this routine once.

It should be noted that when the accelerator pedal 41 is pressed, and the driver requested driving torque TQ1drv_req becomes greater than the system requested driving torque TQ1sys_req while executing the ordinary following control, the vehicle driving assistance apparatus 10 determines that there is an accelerator override state or a driver override state, stops executing the ordinary following control, and causes the driving apparatus 21 to output the driving torque corresponding to the driver requested driving torque TQ1drv_req. That is, the vehicle driving assistance apparatus 10 stops executing the ordinary following control and starts to execute the ordinary moving control. Thereafter, when the accelerator pedal 41 is released, and the driver requested driving torque TQ1drv_req becomes equal to or smaller than the system requested driving torque TQ1sys_req, the vehicle driving assistance apparatus 10 restarts to execute the ordinary following control.

Figure 14:
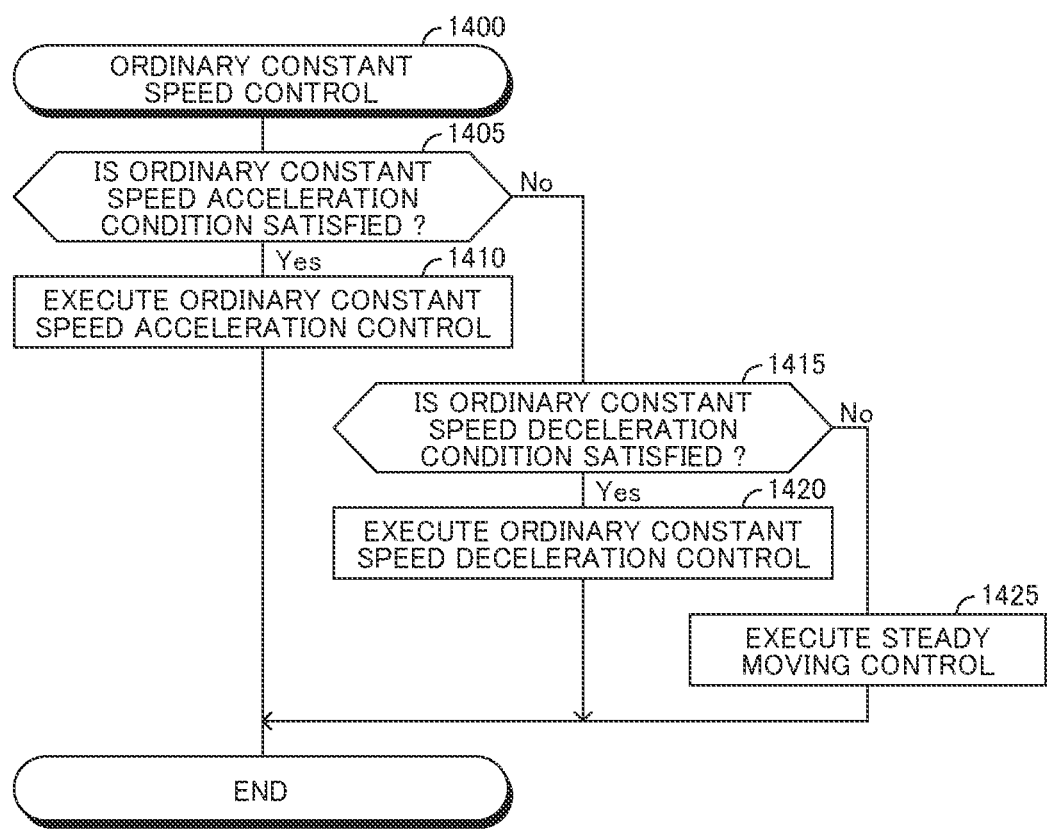
FIG. 14 is a view which shows a flowchart of a routine executed by the vehicle driving assistance apparatus according to the embodiment of the invention.

On the other hand, when there is not the preceding vehicle 200F at a point of time of executing a process of the step 1205 of the routine shown in FIG. 12, the vehicle driving assistance apparatus 10 determines "No" at the step 1205 and proceeds with the process to a step 1215 to execute the ordinary constant speed control by executing the routine shown in FIG. 14. Thus, when the vehicle driving assistance apparatus 10 proceeds with the process to the step 1215, the vehicle driving assistance apparatus 10 starts a process from a step 1400 of the routine shown in FIG. 14 and proceeds with the process to a step 1405.

As described above, the ordinary constant speed control is a control to autonomously accelerate and decelerate the own vehicle 100 so as to maintain the own vehicle moving speed V1 at the set speed Vset. Thus, when the own vehicle moving speed V1 becomes smaller than the set speed Vset, i.e., an ordinary constant speed acceleration condition C5 becomes satisfied, the vehicle driving assistance apparatus 10 accelerates the own vehicle 100. On the other hand, when the own vehicle moving speed V1 becomes greater than the set speed Vset, i.e., an ordinary constant speed deceleration condition C6 becomes satisfied, the vehicle driving assistance apparatus 10 decelerates the own vehicle 100.

Accordingly, when the vehicle driving assistance apparatus 10 proceeds with the process to the step 1405, the vehicle driving assistance apparatus 10 determines whether the ordinary constant speed acceleration condition C5 is satisfied. When the ordinary constant speed acceleration condition C5 is satisfied, the vehicle driving assistance apparatus 10 determines "Yes" at the step 1405 and proceeds with the process to a step 1410 to execute an ordinary constant speed acceleration control.

The ordinary constant speed acceleration control is a control to (i) calculate and acquire the driving torque to be output from the driving apparatus 21 so as to maintain the own vehicle moving speed V1 at the set speed Vset, (ii) set the acquired driving torque as the system requested driving torque TQ1sys_req, and (iii) cause the driving apparatus 21 to output the driving torque corresponding to the set system requested driving torque TQ1sys_req.

After the vehicle driving assistance apparatus 10 executes a process of the step 1410, the vehicle driving assistance apparatus 10 terminates executing the process of this routine once.

On the other hand, when the ordinary constant speed acceleration condition C5 is not satisfied, the vehicle driving assistance apparatus 10 determines "No" at the step 1405 and proceeds with the process to a step 1415 to determine whether the ordinary constant speed deceleration condition C6 is satisfied. When the ordinary constant speed deceleration condition C6 is satisfied, the vehicle driving assistance apparatus 10 determines "Yes" at the step 1415 and proceeds with the process to a step 1420 to execute an ordinary constant speed deceleration control.

The ordinary constant speed deceleration control is a control to (i) calculate and acquire the driving torque to be output from the driving apparatus 21 so as to maintain the own vehicle moving speed V1 at the set speed Vset and set the acquired driving torque as the system requested driving torque TQ1sys_req, (ii) calculate and acquire the braking torque to be applied to the own vehicle 100 by the braking apparatus 22 so as to maintain the own vehicle moving speed V1 at the set speed Vset and set the acquired braking torque as the system requested braking torque TQ2sys_req, and (iii) cause the driving apparatus 21 to output the driving torque corresponding to the set system requested driving torque TQ1sys_req and cause the braking apparatus 22 to apply the braking torque corresponding to the set system requested braking torque TQ2sys_req to the own vehicle 100.

After the vehicle driving assistance apparatus 10 executes a process of the step 1420, the vehicle driving assistance apparatus 10 terminates executing the process of this routine once.

On the other hand, when the ordinary constant speed deceleration condition C6 is not satisfied, the vehicle driving assistance apparatus 10 determines "No" at the step 1415 and proceeds with the process to a step 1425 to execute the steady moving control. Then, the vehicle driving assistance apparatus 10 terminates executing the process of this routine once.

In this regard, when the accelerator pedal 41 is pressed, and the driver requested driving torque TQ1drv_req becomes greater than the system requested driving torque TQ1sys_req while executing the ordinary constant speed control, the vehicle driving assistance apparatus 10 determines that there is the accelerator override state, stops executing the ordinary constant speed control, and causes the driving apparatus 21 to output the driving torque corresponding to the driver requested driving torque TQ1drv_req. That is, the vehicle driving assistance apparatus 10 stops executing the ordinary constant speed control and starts to execute the ordinary moving control. Thereafter, when the accelerator pedal 41 is released, and the driver requested driving torque TQ1drv_req becomes equal to or smaller than the system requested driving torque TQ1sys_req, the vehicle driving assistance apparatus 10 restarts to execute the ordinary constant speed control.

On the other hand, when the efficiency prioritizing request condition C2 is satisfied at a point of time of executing a process of the step 510 of the routine shown in FIG. 5, the vehicle driving assistance apparatus 10 determines "Yes" at the step 510 and proceeds with the process to a step 515.

When there is the synchronous target vehicle 200E, and the synchronous target vehicle 200E is moved by the efficiency prioritized assistance control, i.e., a synchronous condition is satisfied, the vehicle driving assistance apparatus 10 executes the synchronous switching following control. On the other hand, when there is not the synchronous target vehicle 200E or when there is the synchronous target vehicle 200E, but the synchronous target vehicle 200E is not moved by the efficiency prioritized assistance control, the vehicle driving assistance apparatus 10 executes one of the non-synchronous switching following control and the switching constant speed control, depending on whether there is the preceding vehicle 200F. Accordingly, when the vehicle driving assistance apparatus 10 proceeds with the process to the step 515, the vehicle driving assistance apparatus 10 determines whether there is the synchronous target vehicle 200E.

When there is the synchronous target vehicle 200E, the vehicle driving assistance apparatus 10 determines "Yes" at the step 515 and proceeds with the process to a step 520 to determine whether the synchronous target vehicle 200E is moved by the efficiency prioritizing assistance control. When the synchronous target vehicle 200E is moved by the efficiency prioritized assistance control, the vehicle driving assistance apparatus 10 determines "Yes" at the step 520 and proceeds with the process to a step 525 to execute the synchronous switching following control by executing the routine shown in FIG. 6 or FIG. 7.

Figure 6:
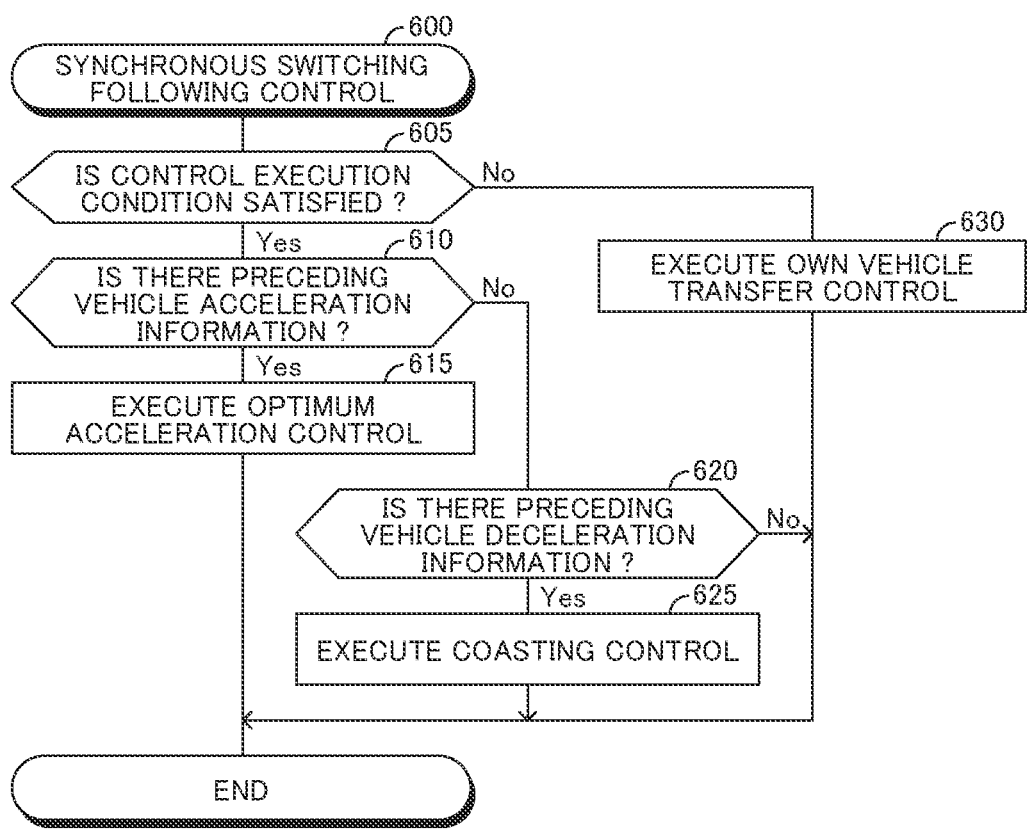
FIG. 6 is a view which shows a flowchart of a routine executed by the vehicle driving assistance apparatus according to the embodiment of the invention.

Thus, when the vehicle driving assistance apparatus 10 proceeds with the process to the step 525 and executes the routine shown in FIG. 6, the vehicle driving assistance apparatus 10 starts a process from a step 600 of the routine shown in FIG. 6 and proceeds with the process to a step 605.

When the synchronous target vehicle 200E moved by the efficiency prioritized assistance control is the preceding vehicle 200F, i.e., a control execution condition C7 is satisfied, the vehicle driving assistance apparatus 10 accelerates and decelerates the own vehicle 100 by the optimum acceleration control and the coasting control, respectively. On the other hand, when the control execution condition C7 is not satisfied, the vehicle driving assistance apparatus 10 transfers the own vehicle 100 to behind the synchronous target vehicle 200E as the other vehicle and then, accelerates and decelerates the own vehicle 100 by the optimum acceleration control and the coasting control, respectively.

Accordingly, when the vehicle driving assistance apparatus 10 proceeds with the process to the step 605, the vehicle driving assistance apparatus 10 determines whether the control execution condition C7 is satisfied. When the control execution condition C7 is not satisfied, the vehicle driving assistance apparatus 10 determines "No" at the step 605 and proceeds with the process to a step 630 to execute an own vehicle transfer control. The own vehicle transfer control is a control to transfer the own vehicle 100 to behind the synchronous target vehicle 200E. After the vehicle driving assistance apparatus 10 executes a process of the step 630, the vehicle driving assistance apparatus 10 terminates executing the process of this routine once.

On the other hand, when the control execution condition C7 is satisfied, the vehicle driving assistance apparatus 10 determines "Yes" at the step 605 and proceeds with the process to a step 610.

As described above, in this embodiment, the vehicle driving assistance apparatus 10 is configured to transfer the own vehicle 100 to behind the synchronous target vehicle 200E by the own vehicle transfer control when the synchronous target vehicle 200E moved by the efficiency prioritized assistance control is not the preceding vehicle 200F. In this regard, in place of executing the own vehicle transfer control, the vehicle driving assistance apparatus 10 may be configured to execute a control to inform the own vehicle driver by a display or a speaker that there is the synchronous target vehicle 200E moved by the efficiency prioritized assistance control or recommend the own vehicle driver by the display or the speaker to set the synchronous target vehicle 200E as a target vehicle to be followed by the own vehicle 100.

Further, as described above, the synchronous switching following control is a control to autonomously accelerate and decelerate the own vehicle 100 by the optimum acceleration control and the coasting control, respectively so as to follow the synchronous target vehicle 200E corresponding to the preceding vehicle 200F moved by the efficiency prioritized assistance control synchronously or almost synchronously with the acceleration and the deceleration of the preceding vehicle 200F, respectively. Thus, when the preceding vehicle 200F is accelerated by the optimum acceleration control, the vehicle driving assistance apparatus 10 accelerates the own vehicle 100 by the optimum acceleration control. On the other hand, when the preceding vehicle 200F is decelerated by the coasting control, the vehicle driving assistance apparatus 10 decelerates the own vehicle 100 by the coasting control.

Accordingly, when the vehicle driving assistance apparatus 10 proceeds with the process to the step 610, the vehicle driving assistance apparatus 10 determines whether there is information that the preceding vehicle 200F is accelerated, based on the vehicle-to-vehicle communication information IV. When there is the information that the preceding vehicle 200F is accelerated, the vehicle driving assistance apparatus 10 determines "Yes" at the step 610 and proceeds with the process to a step 615 to execute the optimum acceleration control. Then, the vehicle driving assistance apparatus 10 terminates executing the process of this routine once.

On the other hand, when there is no information that the preceding vehicle 200F is accelerated, the vehicle driving assistance apparatus 10 determines "No" at the step 610 and proceeds with the process to a step 620 to determine whether there is information that the preceding vehicle 200F is decelerated, based on the vehicle-to-vehicle communication information IV. When there is the information that the preceding vehicle 200F is decelerated, the vehicle driving assistance apparatus 10 determines "Yes" at the step 620 and proceeds with the process to a step 625 to execute the coasting control. Then, the vehicle driving assistance apparatus 10 terminates executing the process of this routine once.

On the other hand, when there is no information that the preceding vehicle 200F is decelerated, the vehicle driving assistance apparatus 10 determines "No" at the step 620 and terminates executing the process of this routine once. In this case, when the vehicle driving assistance apparatus 10 executes the optimum acceleration control, the vehicle driving assistance apparatus 10 continues executing the optimum acceleration control. On the other hand, when the vehicle driving assistance apparatus 10 executes the coasting control, the vehicle driving assistance apparatus 10 continues executing the coasting control.

Figure 7:
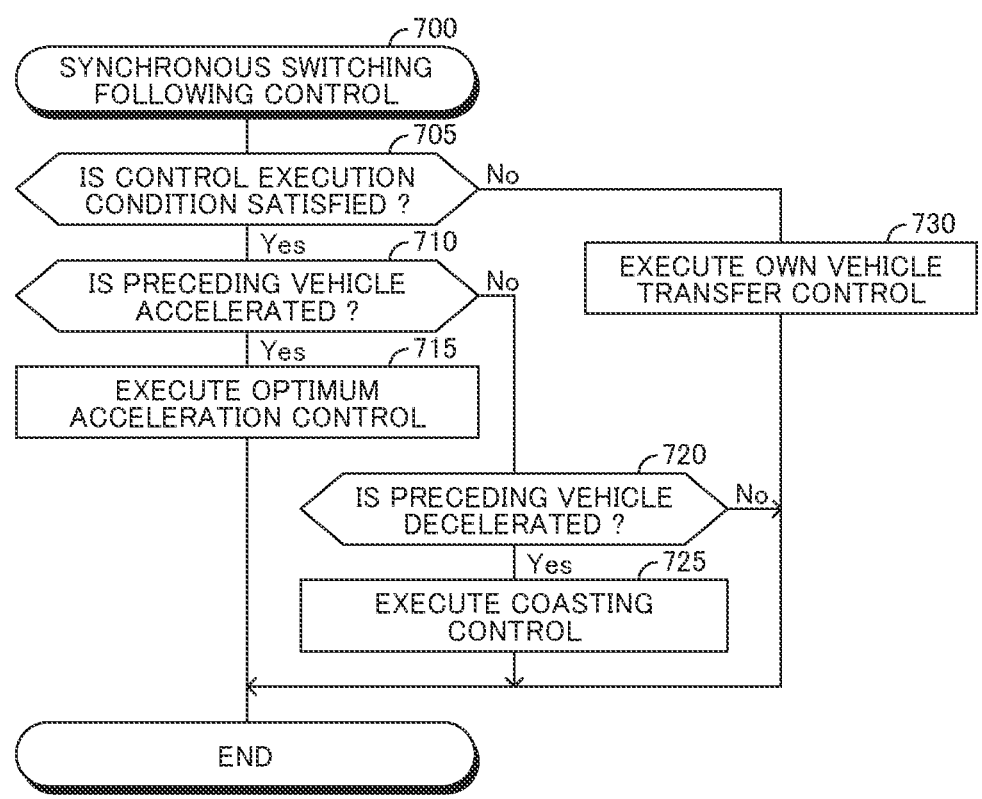
FIG. 7 is a view which shows a flowchart of a routine executed by the vehicle driving assistance apparatus according to the embodiment of the invention.

Alternatively, when the vehicle driving assistance apparatus 10 proceeds with the process to the step 525 and executes the routine shown in FIG. 7, the vehicle driving assistance apparatus 10 starts a process from a step 700 of the routine shown in FIG. 7 and proceeds with the process to a step 705 to determine whether the control execution condition C7 is satisfied.

When the control execution condition C7 is not satisfied, the vehicle driving assistance apparatus 10 determines "No" at the step 705 and proceeds with the process to a step 730 to execute the own vehicle transfer control. Then, the vehicle driving assistance apparatus 10 terminates executing the process of this routine once.

On the other hand, when the control execution condition C7 is satisfied, the vehicle driving assistance apparatus 10 determines "Yes" at the step 705 and proceeds with the process to a step 710 to determine whether the preceding vehicle 200F is accelerated, based on the surrounding detection information IS. When the preceding vehicle 200F is accelerated, the vehicle driving assistance apparatus 10 determines "Yes" at the step 710 and proceeds with the process to a step 715 to execute the optimum acceleration control. Then, the vehicle driving assistance apparatus 10 terminates executing the process of this routine once.

On the other hand, when the preceding vehicle 200F is not accelerated, the vehicle driving assistance apparatus 10 determines "No" at the step 710 and proceeds with the process to a step 720 to determine whether the preceding vehicle 200F is decelerated, based on the surrounding detection information IS. When the preceding vehicle 200F is decelerated, the vehicle driving assistance apparatus 10 determines "Yes" at the step 720 and proceeds with the process to a step 725 to execute the coasting control. Then, the vehicle driving assistance apparatus 10 terminates executing the process of this routine once.

On the other hand, when the preceding vehicle 200F is not decelerated, the vehicle driving assistance apparatus 10 determines "No" at the step 720 and terminates executing the process of this routine once. In this case, when the vehicle driving assistance apparatus 10 executes the optimum acceleration control, the vehicle driving assistance apparatus 10 continues executing the optimum acceleration control. On the other hand, when the vehicle driving assistance apparatus 10 executes the coasting control, the vehicle driving assistance apparatus 10 continues executing the coasting control.

As described above, when there is the preceding vehicle 200F, but the preceding vehicle 200F is not the synchronous target vehicle 200E, or when the preceding vehicle 200F is the synchronous target vehicle 200E, but the preceding vehicle 200F is not moved by the efficiency prioritized assistance control, the vehicle driving assistance apparatus 10 does not execute the synchronous switching following control. In this case, there is an option that the vehicle driving assistance apparatus 10 executes the ordinary following control. The ordinary following control does not use the optimum acceleration control to accelerate the own vehicle 100 and the coasting control to decelerate the own vehicle 100. Therefore, the energy efficiency of the driving apparatus 21 to accelerate and decelerate the own vehicle 100 is small, compared with a case that the own vehicle 100 is accelerated by the optimum acceleration control and is decelerated by the coasting control.

However, when the own vehicle 100 is accelerated by the optimum acceleration control and is decelerated by the coasting control, the inter-vehicle distance D increases and decreases. Therefore, an air resistance decreasing effect, i.e., an effect of increasing the energy efficiency of the driving apparatus 21 by a decrease of an air resistance to the own vehicle 100, may be small, compared with a case that the ordinary following control is executed.

As can be understood, comparing a case that the own vehicle 100 is moved by the optimum acceleration control and the coasting control, respectively with a case that the own vehicle 100 is move by the ordinary following control, the air resistance decreasing effect can be realized, but the energy efficiency of the driving apparatus 21 for accelerating and decelerating the own vehicle 100, is small when the own vehicle 100 is moved by the ordinary following control. On the other hand, when the own vehicle 100 is moved by the optimum acceleration control and the coasting control, respectively, the energy efficiency of the driving apparatus 21 for accelerating and decelerating the own vehicle 100 is great, but the air resistance decreasing effect may be small.

Accordingly, when there is not the synchronous target vehicle 200E, or when there is the synchronous target vehicle 200E, but the synchronous target vehicle 200E is not moved by the efficiency prioritized assistance control, the vehicle driving assistance apparatus 10 determines whether to execute the non-synchronous switching following control or the ordinary following control, depending on whether there is the preceding vehicle 200F. When there is not the preceding vehicle 200F, the vehicle driving assistance apparatus 10 execute the switching constant speed control.

Accordingly, when there is not the synchronous target vehicle 200E at a point of time of executing a process of the step 515 of the routine shown in FIG. 5, the vehicle driving assistance apparatus 10 determines "No" at the step 515 and proceeds with the process to a step 530 to determine whether there is the preceding vehicle 200F.

Further, when the synchronous target vehicle 200E is not moved by the efficiency prioritized assistance control at a point of time of executing a process of the step 520 of the routine shown in FIG. 5, the vehicle driving assistance apparatus 10 determines "No" at the step 520 and proceeds with the process to the step 530 to determine whether there is the preceding vehicle 200F.

Figure 11:
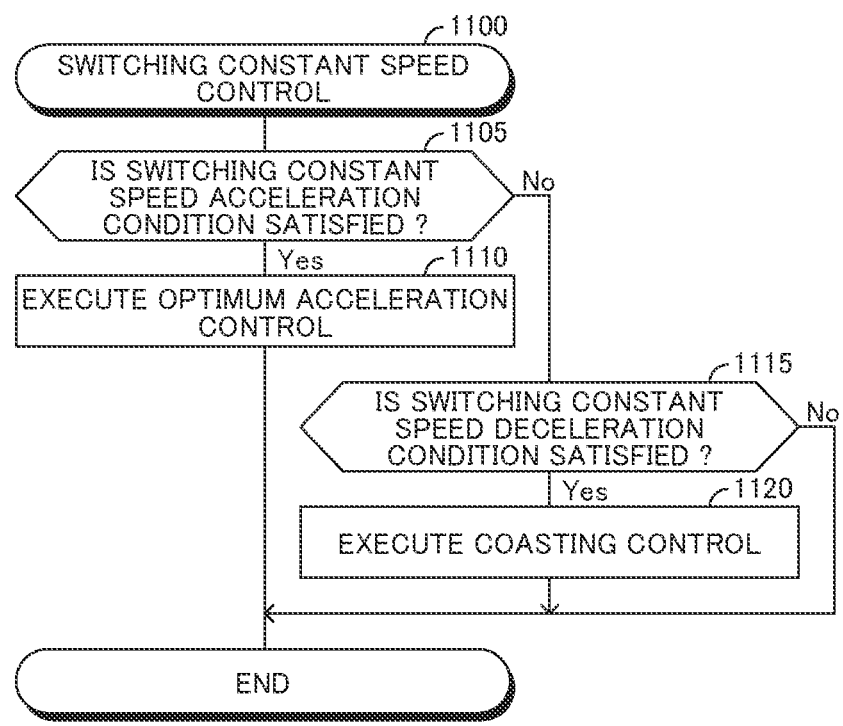
FIG. 11 is a view which shows a flowchart of a routine executed by the vehicle driving assistance apparatus according to the embodiment of the invention.

When there is no preceding vehicle 200F, the vehicle driving assistance apparatus 10 determines "No" at the step 530 and proceeds with the process to a step 540 to execute the switching constant speed control by executing the routine shown in FIG. 11. Thus, when the vehicle driving assistance apparatus 10 proceeds with the process to the step 540, the vehicle driving assistance apparatus 10 starts a process from a step 1100 of the routine shown in FIG. 11 and proceeds with the process to a step 1105.

As described above, the switching constant speed control is a control to autonomously accelerate and decelerate the own vehicle 100, respectively at predetermined timings so as to maintain the own vehicle moving speed V1 within the predetermined range. In particular, in this embodiment, the switching constant speed control is a control to (i) set a range having the set speed Vset as its center value as a set speed range RVset and autonomously accelerate and decelerate the own vehicle 100 by the optimum acceleration control and the coasting control, respectively so as to maintain the own vehicle moving speed V1 within the set speed range RVset. Thus, when the own vehicle moving speed V1 becomes smaller than a lower limit of the set speed range RVset, i.e., a switching constant speed acceleration condition C8 becomes satisfied, the vehicle driving assistance apparatus 10 accelerates the own vehicle 100 by the optimum acceleration control. On the other hand, when the own vehicle moving speed V1 becomes greater than an upper limit of the set speed range RVset, i.e., a switching constant speed deceleration condition C9 becomes satisfied, the vehicle driving assistance apparatus 10 decelerates the own vehicle 100 by the coasting control.

Accordingly, when the vehicle driving assistance apparatus 10 proceeds with the process to the step 1105, the vehicle driving assistance apparatus 10 determines whether the switching constant speed acceleration condition C8 is satisfied. When the switching constant speed acceleration condition C8 is satisfied, the vehicle driving assistance apparatus 10 determines "Yes" at the step 1105 and proceeds with the process to a step 1110 to execute the optimum acceleration control. Then, the vehicle driving assistance apparatus 10 terminates executing the process of this routine once.

On the other hand, when the switching constant speed acceleration condition C8 is not satisfied, the vehicle driving assistance apparatus 10 determines "No" at the step 1105 and proceeds with the process to a step 1115 to determine whether the switching constant speed deceleration condition C9 is satisfied. When the switching constant speed deceleration condition C9 is satisfied, the vehicle driving assistance apparatus 10 determines "Yes" at the step 1115 and proceeds with the process to a step 1120 to execute the coasting control. Then, the vehicle driving assistance apparatus 10 terminates executing the process of this routine once.

On the other hand, when the switching constant speed deceleration condition C9 is not satisfied, the vehicle driving assistance apparatus 10 determines "No" at the step 1115 and terminates executing the process of this routine once. In this case, when the vehicle driving assistance apparatus 10 executes the optimum acceleration control, the vehicle driving assistance apparatus 10 continues executing the optimum acceleration control. On the other hand, when the vehicle driving assistance apparatus 10 executes the coasting control, the vehicle driving assistance apparatus 10 continues executing the coasting control.

Figure 8:
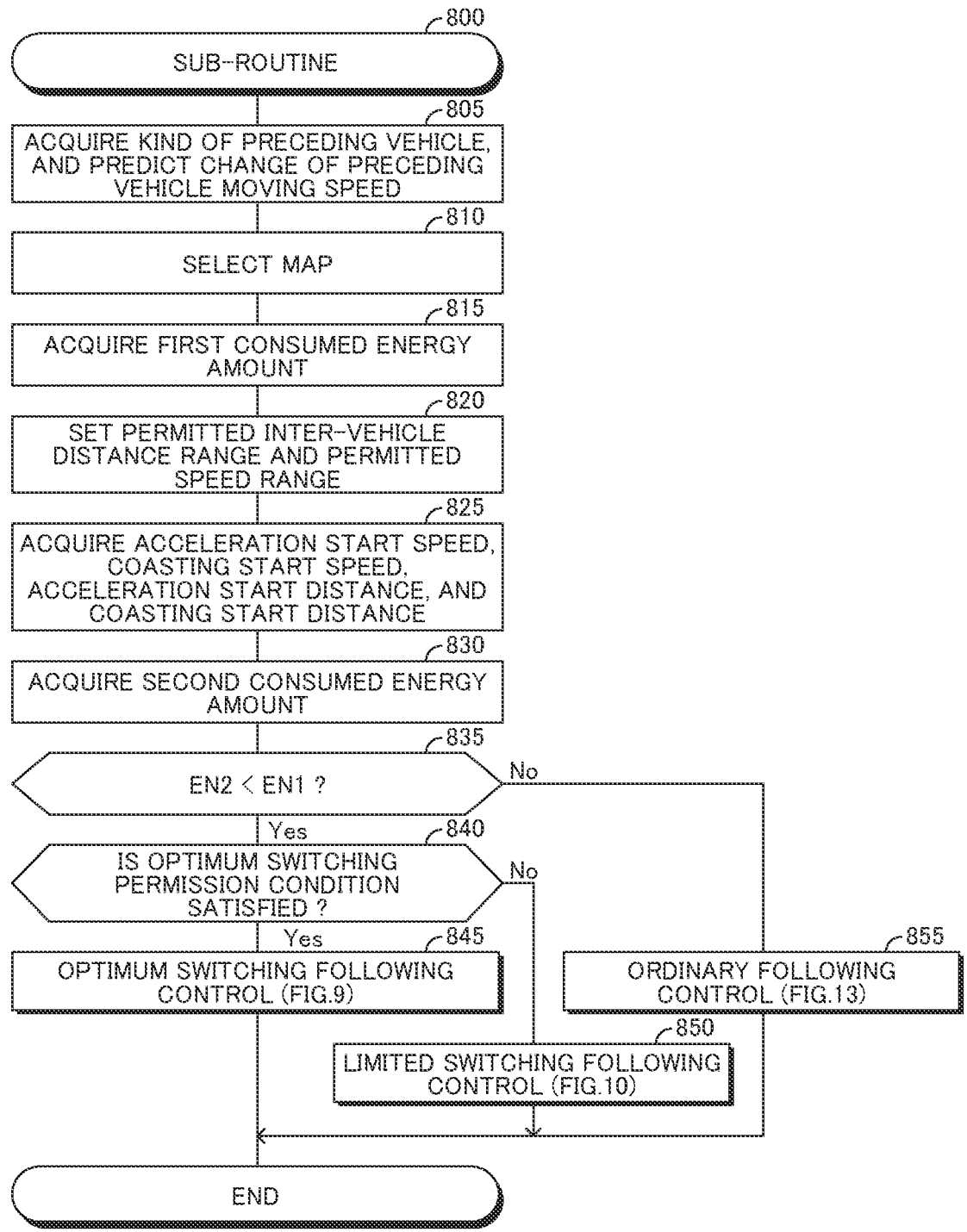
FIG. 8 is a view which shows a flowchart of a routine executed by the vehicle driving assistance apparatus according to the embodiment of the invention.

On the other hand, when there is the preceding vehicle 200F at a point of time of executing a process of the step 530 of the routine shown in FIG. 5, the vehicle driving assistance apparatus 10 determines "Yes" at the step 530 and proceeds with the process to a step 535 to execute the routine shown in FIG. 8. Thus, when the vehicle driving assistance apparatus 10 proceeds with the process to the step 535, the vehicle driving assistance apparatus 10 starts a process from a step 800 of the routine shown in FIG. 8.

When the consumed energy amount of the driving apparatus 21 for moving the own vehicle 100 by the non-synchronous switching following control, is smaller than the consumed energy amount of the driving apparatus 21 for moving the own vehicle 100 by the ordinary following control, the vehicle driving assistance apparatus 10 executes the non-synchronous switching following control. On the other hand, when the consumed energy amount of the driving apparatus 21 for moving the own vehicle 100 by the non-synchronous switching following control, is greater than the consumed energy amount of the driving apparatus 21 for moving the own vehicle 100 by the ordinary following control, the vehicle driving assistance apparatus 10 executes the ordinary following control.

Accordingly, the vehicle driving assistance apparatus 10 acquires a first consumed energy amount EN1 and a second consumed energy amount EN2 as described below. The first consumed energy amount EN1 is the consumed energy amount of the driving apparatus 21 for moving the own vehicle 100 by the ordinary following control. The second consumed energy amount EN2 is the consumed energy amount of the driving apparatus 21 for moving the own vehicle 100 by the non-synchronous switching following control.

A following moving decreasing amount ΔENacc, i.e., a decrease of the consumed energy amount of the driving apparatus 21 by a decrease of the air resistance to the own vehicle 100 by moving the own vehicle 100, following the preceding vehicle 200F, depends on a kind of the preceding vehicle 200F, in particular, a size of a body of the preceding vehicle 200F. In general, as the size of the body of the preceding vehicle 200F increases, the air resistance to the own vehicle 100 decreases. Accordingly, the vehicle driving assistance apparatus 10 acquires the kind of the preceding vehicle 200F, based on the surrounding detection information IS and/or the vehicle-to-vehicle communication information IV.

In addition, the following moving decrease amount ΔENacc also depends on the inter-vehicle distance D and the own vehicle moving speed V1. In general, as the inter-vehicle distance D decreases, the air resistance to the own vehicle 100 decreases, and as the own vehicle moving speed V1 decreases, the air resistance to the own vehicle 100 decreases. Accordingly, the vehicle driving assistance apparatus 10 predicts the future preceding vehicle moving speed V2, based on a history of a change of the preceding vehicle moving speed V2 acquired and stored, based on the surrounding detection information IS and/or the vehicle-to-vehicle communication information IV. Then, the vehicle driving assistance apparatus 10 predicts the inter-vehicle distance D and the own vehicle moving speed V1 assuming that the vehicle driving assistance apparatus 10 moves the own vehicle 100 by the ordinary following control, following the preceding vehicle 200F moving at the predicted preceding vehicle moving speed V2pre.

Then, the vehicle driving assistance apparatus 10 calculates and acquires the consumed energy amount of the driving apparatus 21 for moving the own vehicle 100 by the ordinary following control, based on the size of the preceding vehicle 200F, the predicted inter-vehicle distance D, and the predicted own vehicle moving speed V1. Then, the vehicle driving assistance apparatus 10 has the acquired consumed energy amount as the first consumed energy amount EN1.

Figure 15:
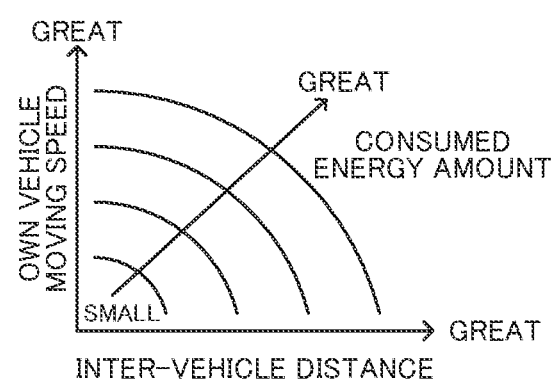
FIG. 15 is a view which shows a map or a look-up table which defines a relationship between an inter-vehicle distance, an own vehicle moving speed, and a consumed energy amount.

In this regard, in this embodiment, as shown in FIG. 15, the vehicle driving assistance apparatus 10 previously stores a map or a look-up table for each kind of the preceding vehicle 200F for acquiring the consumed energy amount of the driving apparatus 21, based on the inter-vehicle distance D and the own vehicle moving speed V1. Therefore, the vehicle driving assistance apparatus 10 selects the map corresponding to the kind of the preceding vehicle 200F and acquires the consumed energy amount of the driving apparatus 21 for moving the own vehicle 100 by the ordinary following control by integrating the consumed energy amounts acquired by applying the inter-vehicle distance D and the own vehicle moving speed V1 predicted as described above to the selected map.

On the other hand, when the own vehicle 100 is moved by the non-synchronous switching following control, the inter-vehicle distance D and the own vehicle moving speed V1 considerably increase and decrease, compared with a case that the own vehicle 100 is moved by the ordinary following control. In this regard, if the inter-vehicle distance D excessively increases, or the own vehicle moving speed V1 excessively decreases, it may lead to a traffic jam. Therefore, the own vehicle 100 is preferably moved by the non-synchronous switching following control such that the inter-vehicle distance D does not become greater than a maximum permitted distance Dmax, and the own vehicle moving speed V1 does not become smaller than a minimum permitted speed Vmin.

In addition, it is not preferred in a point of view of a moving safety of the own vehicle 100 that the inter-vehicle distance D excessively decreases, or the own vehicle moving speed V1 excessively increases. Further, the own vehicle moving speed V1 should be limited to below a speed limit regulated by traffic regulations. Therefore, the own vehicle 100 is preferably moved by the non-synchronous switching following control such that the inter-vehicle distance D does not become smaller than a minimum permitted distance Dmin, and the own vehicle moving speed V1 does not become greater than a maximum permitted speed Vmax.

Figure 16:
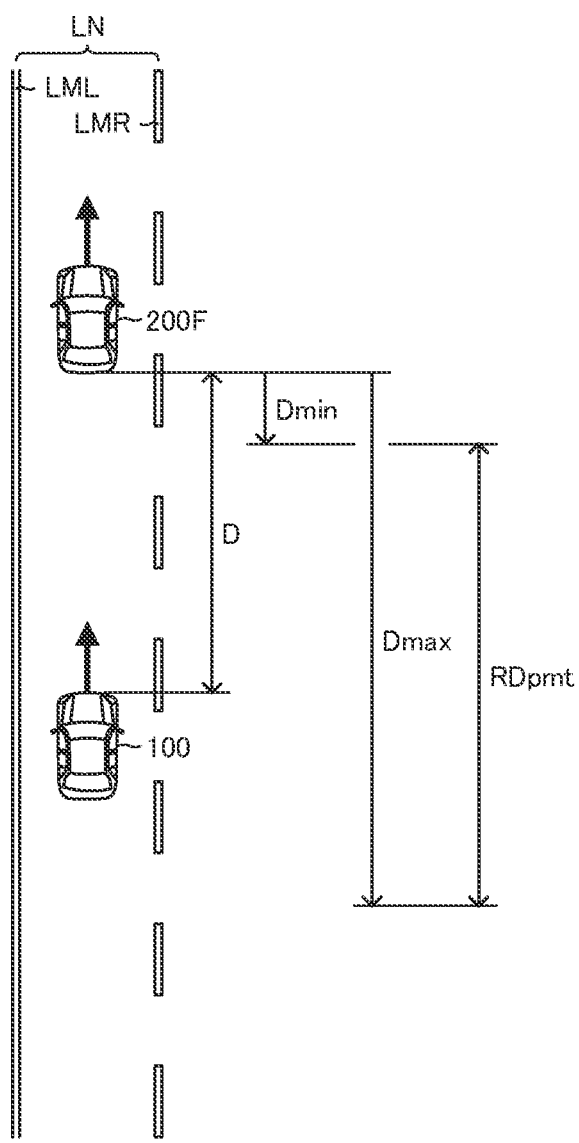
FIG. 16 is a view which shows a maximum permitted distance, a minimum permitted distance, and a permitted distance range (or a second predetermined distance range).

Thus, as shown in FIG. 16, the vehicle driving assistance apparatus 10 sets the maximum permitted distance Dmax and the minimum permitted distance Dmin and sets a range between the maximum permitted distance Dmax and the minimum permitted distance Dmin as a permitted distance range RDpmt (or a second predetermined distance range). In addition, the vehicle driving assistance apparatus 10 sets the maximum permitted speed Vmax and the minimum permitted speed Vmin and sets a range between the maximum permitted speed Vmax and the minimum permitted speed Vmin as a permitted speed range RVpmt (or a predetermined speed range).

As described above, when the ordinary following control is a control to autonomously accelerate and decelerate the own vehicle 100, respectively so as to maintain the inter-vehicle distance D within the predetermined range (or the first predetermined distance range), the permitted distance range RDpmt (or a second predetermined distance range) is greater than the predetermined range (or the first predetermined distance range) used by the ordinary following control.

Further, the permitted distance range RDpmt and the permitted speed range RVpmt are preferably sets, depending on an environmental traffic condition on the moving own vehicle 100 such as a kind of a road on which the own vehicle 100 moves. For example, in general, the maximum permitted distance Dmax set for the own vehicle 100 moving on a general road, is smaller than the maximum permitted distance Dmax set for the own vehicle 100 moving on a freeway or a motorway. Further, in general, the minimum permitted speed Vmin set for the own vehicle 100 moving on the general road, is smaller than the minimum permitted speed Vmin set for the own vehicle 100 moving on the freeway or the motorway. Accordingly, in this embodiment, the vehicle driving assistance apparatus 10 (i) sets the maximum permitted distance Dmax, the minimum permitted distance Dmin, the maximum permitted speed Vmax, and the minimum permitted speed Vmin, and (ii) sets the permitted distance range RDpmt and the permitted speed range RVpmt, depending on the environmental traffic condition on the moving own vehicle 100. It should be noted that the maximum permitted distance Dmax may be set, depending on the environmental traffic condition on the moving own vehicle 100 and the requested inter-vehicle distance Dreq. In this case, as the requested inter-vehicle distance Dreq increases, the maximum permitted distance Dmax increases.

As far as a constraint condition that the inter-vehicle distance D is maintained within the permitted distance range RDpmt, and the own vehicle moving speed V1 is maintained within the permitted speed range RVpmt, is satisfied, the vehicle driving assistance apparatus 10 (i) acquires an acceleration start speed Vacc, an acceleration start distance Dacc, a coasting start speed Vcst, and a coasting start distance Dcst, (ii) acquires the current consumed energy amount, and (iii) has the acquired current consumed energy amount as the second consumed energy amount EN2. The acceleration start speed Vacc is a threshold of the inter-vehicle distance D for determining starting to execute the optimum acceleration control. The acceleration start distance Dacc is a threshold of the own vehicle moving speed V1 for determining starting to execute the optimum acceleration control. The coasting start speed Vcst is a threshold of the own vehicle moving speed V1 for determining starting to execute the coasting control. The coasting start distance Dcst is a threshold of the inter-vehicle distance D for determining starting to execute the coasting control. The acceleration start speed Vacc, the acceleration start distance Dacc, the coasting start speed Vcst, and the coasting start distance Dcst are ones for minimizing the consumed energy amount of the driving apparatus 21 when moving the own vehicle 100 by the non-synchronous switching following control, following the preceding vehicle 200F moving at the predicted preceding vehicle moving speed V2pre predicted described above.

Figure 17:
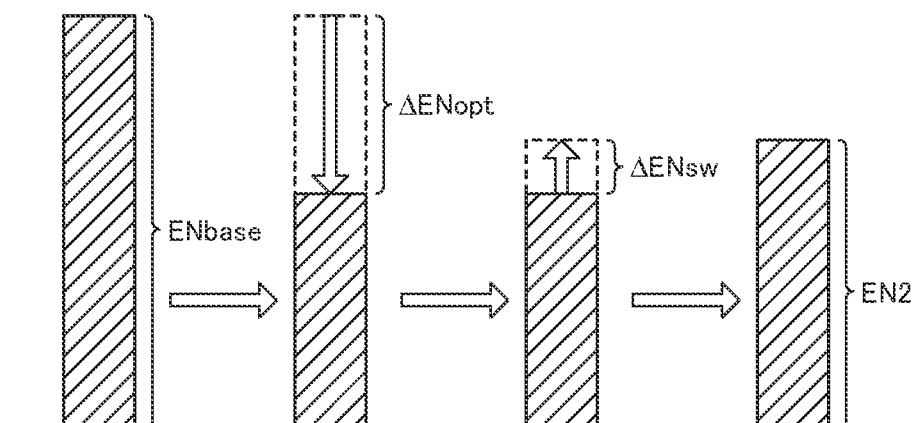
FIG. 17 is a view which describes a calculation method of calculating a second consumed energy amount, i.e., an amount of energy consumed by a driving apparatus for moving the own vehicle by a non-synchronous switching following control.

In this regard, the vehicle driving assistance apparatus 10 (i) predicts the inter-vehicle distance D and the own vehicle moving speed V1 assuming that the own vehicle 100 is moved, following the preceding vehicle 200F by the non-synchronous switching following control, (ii) acquires the consumed energy amount by applying the acquired inter-vehicle distance D and the acquired own vehicle moving speed V1 to the map corresponding to the kind of the preceding vehicle 200F (see FIG. 15), and (iii) has the acquired consumed energy amount as a base consumed energy amount ENbase (see FIG. 17). In addition, the vehicle driving assistance apparatus 10 acquires an optimum acceleration decrease amount ΔENopt. The optimum acceleration decrease amount ΔENopt is a difference between the consumed energy amount for accelerating the own vehicle 100 by the following moving control and the consumed energy amount for accelerating the own vehicle 100 by the optimum acceleration control. In addition, the vehicle driving assistance apparatus 10 acquires an operation state switching increase amount ΔENsw. The operation state switching increase amount ΔENsw is the consumed energy amount when the control is changed from the coasting control to the optimum acceleration control. Then, the vehicle driving assistance apparatus 10 acquires the second consumed energy amount EN2 (i.e. the consumed energy amount of the driving apparatus 21 for moving the own vehicle 100 by the non-synchronous switching following control) by subtracting the optimum acceleration decrease amount ΔENopt from and adding the operation state switching increase amount ΔENsw to the base consumed energy amount ENbase (EN2=ENbase−ΔENopt+ΔENsw) (see FIG. 17).

When the acquired acceleration start speed Vacc is greater than the minimum permitted speed Vmin, the acceleration start speed Vacc is an optimum acceleration start speed Vacc_opt, i.e., an optimum speed for decreasing the consumed energy amount. Further, when the acquired coasting start speed Vcst is smaller than the maximum permitted speed Vmax, the coasting start speed Vcst is an optimum coasting start speed Vcst_opt, i.e., an optimum speed for decreasing the consumed energy amount. Similarly, when the acquired acceleration start distance Dacc is smaller than the maximum permitted distance Dmax, the acceleration start distance Dacc is an optimum acceleration start distance Dacc_opt, i.e., an optimum distance for decreasing the consumed energy amount. Further, when the acquired coasting start distance Dcst is greater than the minimum permitted distance Dmin, the coasting start distance Dcst is an optimum coasting start distance Dcst_opt, i.e., an optimum distance for decreasing the consumed energy amount.

Then, the vehicle driving assistance apparatus 10 compares the second consumed energy amount EN2 and the first consumed energy amount EN1. When the second consumed energy amount EN2 is smaller than the first consumed energy amount EN1, the vehicle driving assistance apparatus 10 executes the non-synchronous switching following control. On the other hand, when the second consumed energy amount EN2 is equal to or greater than the first consumed energy amount EN1, the vehicle driving assistance apparatus 10 executes the ordinary following control.

In this regard, when the vehicle driving assistance apparatus 10 executes the non-synchronous switching following control, and an optimum switching permission condition C10 is satisfied, the vehicle driving assistance apparatus 10 executes the non-synchronous switching following control or the optimum switching following control by using the optimum acceleration start speed Vacc_opt, the optimum coasting start speed Vcst_opt, the optimum acceleration start distance Dacc_opt, and the optimum coasting start distance Dcst_opt. In this embodiment, the optimum switching permission condition C10 is a condition that (i) the acceleration start distance Dacc acquired as described above is smaller than the maximum permitted distance Dmax, (ii) the coasting start distance Dcst acquired as described above is greater than the minimum permitted distance Dmin, (iii) the acceleration start speed Vacc acquired as described above is greater than the minimum permitted speed Vmin, and (iv) the coasting start speed Vcst acquired as described above is smaller than the maximum permitted speed Vmax.

In this case, in particular, when the own vehicle moving speed V1 increases to the optimum coasting start speed Vcst_opt, the vehicle driving assistance apparatus 10 starts to execute the coasting control. Further, when the inter-vehicle distance D decreases to the optimum coasting start distance Dcst_opt, the vehicle driving assistance apparatus 10 starts to execute the coasting control. Further, when the own vehicle moving speed V1 decreases to the optimum acceleration start speed Vacc_opt, the vehicle driving assistance apparatus 10 starts to execute the optimum acceleration control. Further, when the inter-vehicle distance D increases to the optimum acceleration start distance Dacc_opt, the vehicle driving assistance apparatus 10 starts to execute the optimum acceleration control. That is, the vehicle driving assistance apparatus 10 moves the own vehicle 100, following the preceding vehicle 200F by autonomously accelerating and decelerating the own vehicle 100, respectively so as to (i) maintain the own vehicle moving speed V1 within the predetermined speed range defined by the optimum coasting start speed Vcst_opt and the optimum acceleration start speed Vacc_opt or (ii) maintain the inter-vehicle distance D within the predetermined distance range (or the second predetermined distance range) defined by the optimum coasting start distance Dcst_opt and the optimum acceleration start distance Dacc_opt. In this regard, the predetermined distance range (or the second predetermined distance range) defined by the optimum coasting start distance Dcst_opt and the optimum acceleration start distance Dacc_opt is greater than the predetermined range used in the ordinary following control, i.e., the first predetermined distance range.

On the other hand, when the optimum switching permission condition C10 is not satisfied, the vehicle driving assistance apparatus 10 executes the non-synchronous switching following control or a limited switching following control by using the minimum permitted speed Vmin, the maximum permitted distance Dmax, the maximum permitted speed Vmax, and the minimum permitted distance Dmin.

In this case, in particular, when the own vehicle moving speed V1 increases to the maximum permitted speed Vmax, the vehicle driving assistance apparatus 10 starts to execute the coasting control. Further, when the inter-vehicle distance D decreases to the minimum permitted distance Dmin, the vehicle driving assistance apparatus 10 starts to execute the coasting control. Further, when the own vehicle moving speed V1 decreases to the minimum permitted speed Vmin, the vehicle driving assistance apparatus 10 starts to execute the optimum acceleration control. Further, when the inter-vehicle distance D increases to the maximum permitted distance Dmax, the vehicle driving assistance apparatus 10 starts to execute the optimum acceleration control. That is, the vehicle driving assistance apparatus 10 moves the own vehicle 100, following the preceding vehicle 200F by autonomously accelerating and decelerating the own vehicle 100, respectively so as to (i) maintain the own vehicle moving speed V1 within the predetermined speed range defined by the maximum permitted speed Vmax and the minimum permitted speed Vmin or (ii) maintain the inter-vehicle distance D within the predetermined distance range defined by the minimum permitted distance Dmin and the maximum permitted distance Dmax.

Thus, when the vehicle driving assistance apparatus 10 starts a process from a step 800 of the routine shown in FIG. 8, the vehicle driving assistance apparatus 10 proceeds with the process to a step 805 to (i) acquire the kind of the preceding vehicle 200F, in particular, the size of the preceding vehicle 200F and (ii) predicts the future preceding vehicle moving speed V2.

Then, the vehicle driving assistance apparatus 10 proceeds with the process to a step 810 to select the map or the look-up table corresponding to the acquired kind of the preceding vehicle 200F. Then, the vehicle driving assistance apparatus 10 proceeds with the process to a step 815 to acquires the first consumed energy amount EN1 as described above by using the map selected at the step 810. Then, the vehicle driving assistance apparatus 10 proceeds with the process to a step 820 to set the permitted distance range RDpmt and the permitted speed range RVpmt.

Then, the vehicle driving assistance apparatus 10 proceeds with the process to a step 825 to acquire the acceleration start speed Vacc, the coasting start speed Vcst, the acceleration start distance Dacc, and the coasting start distance Dcst. Then, the vehicle driving assistance apparatus 10 proceeds with the process to a step 830 to acquires the second consumed energy amount EN2 as described above by using the map selected at the step 810.

Then, the vehicle driving assistance apparatus 10 proceeds with the process to a step 835 to determine whether the second consumed energy amount EN2 is smaller than the first consumed energy amount EN1. When the second consumed energy amount EN2 is smaller than the first consumed energy amount EN1, the vehicle driving assistance apparatus 10 determines "Yes" at the step 835 and proceeds with the process to a step 840 to determine whether the optimum switching permission condition C10 is satisfied.

Figure 9:
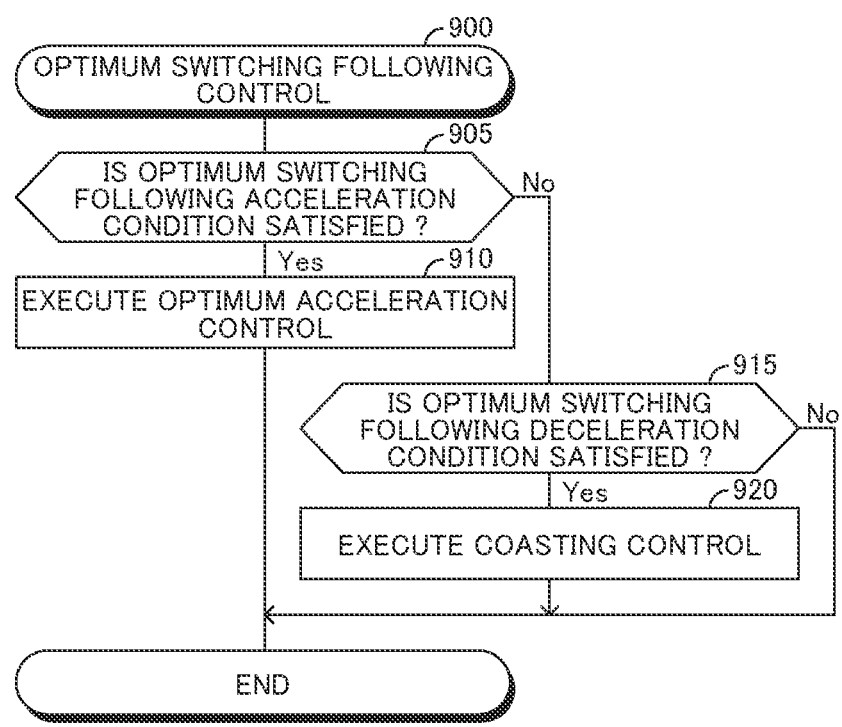
FIG. 9 is a view which shows a flowchart of a routine executed by the vehicle driving assistance apparatus according to the embodiment of the invention.

When the optimum switching permission condition C10 is satisfied, the vehicle driving assistance apparatus 10 determines "Yes" at the step 840 and proceeds with the process to a step 845 to execute the optimum switching following control by executing the routine shown in FIG. 9.

Thus, when the vehicle driving assistance apparatus 10 proceeds with the process to the step 845, the vehicle driving assistance apparatus 10 starts a process from a step 900 of the routine shown in FIG. 9 and proceeds with the process to a step 905 to determine whether an optimum switching following acceleration condition C11 is satisfied. In this embodiment, at the step 905, the vehicle driving assistance apparatus 10 determines whether (i) the own vehicle moving speed V1 has been smaller than the optimum acceleration start speed Vacc_opt, or (ii) the inter-vehicle distance D has been greater than the optimum acceleration start distance Dacc_opt.

When the optimum switching following acceleration condition C11 is satisfied, the vehicle driving assistance apparatus 10 determines "Yes" at the step 905 and proceeds with the process to a step 910 to execute the optimum acceleration control. Then, the vehicle driving assistance apparatus 10 terminates executing the process of this routine once.

On the other hand, when the optimum switching following acceleration condition C11 is not satisfied, the vehicle driving assistance apparatus 10 determines "No" at the step 905 and proceeds with the process to a step 915 to determine whether an optimum switching following deceleration condition C12 is satisfied. In this embodiment, at the step 915, the vehicle driving assistance apparatus 10 determines whether (i) the own vehicle moving speed V1 has been greater than the optimum coasting start speed Vcst_opt, or (ii) the inter-vehicle distance D has been smaller than the optimum coasting start distance Dcst_opt.

When the optimum switching following deceleration condition C12 is satisfied, the vehicle driving assistance apparatus 10 determines "Yes" at the step 915 and proceeds with the process to a step 920 to execute the coasting control. Then, the vehicle driving assistance apparatus 10 terminates executing the process of this routine once.

On the other hand, when the optimum switching following deceleration condition C12 is not satisfied, the vehicle driving assistance apparatus 10 determines "No" at the step 915 and terminates executing the process of this routine once. In this case, when the vehicle driving assistance apparatus 10 executes the optimum acceleration control, the vehicle driving assistance apparatus 10 continues executing the optimum acceleration control. On the other hand, when the vehicle driving assistance apparatus 10 executes the coasting control, the vehicle driving assistance apparatus 10 continues executing the coasting control.

Figure 10:
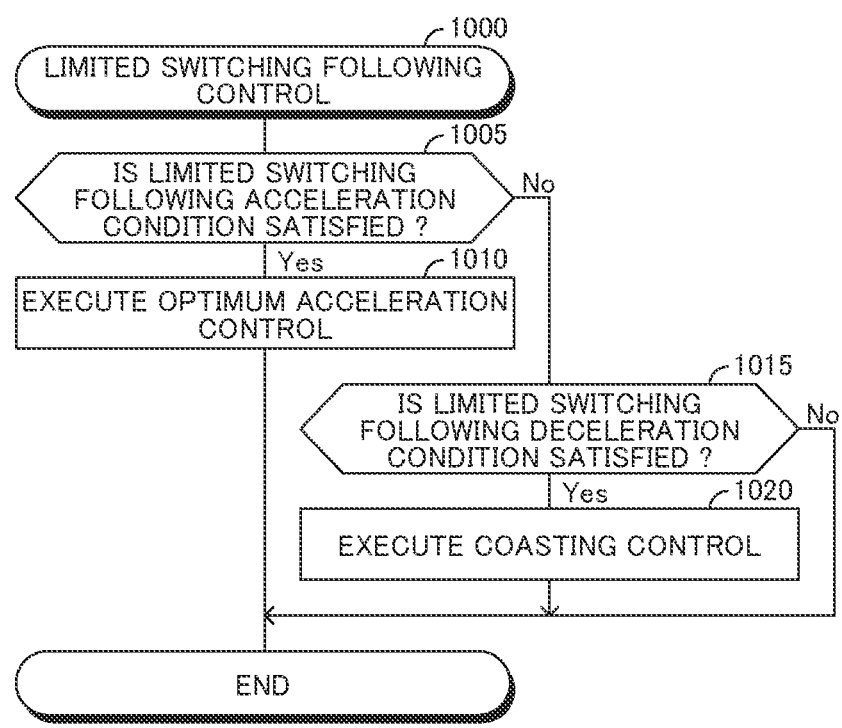
FIG. 10 is a view which shows a flowchart of a routine executed by the vehicle driving assistance apparatus according to the embodiment of the invention.

Further, when the optimum switching permission condition C10 is not satisfied at a point of time of executing a process of the step 840 of the routine shown in FIG. 8, the vehicle driving assistance apparatus 10 determines "No" at the step 840 and proceeds with the process to a step 850 to execute the limited switching following control by executing the routine shown in FIG. 10.

Thus, when the vehicle driving assistance apparatus 10 proceeds with the process to the step 850, the vehicle driving assistance apparatus 10 starts a process from a step 1000 of the routine shown in FIG. 10 and proceeds with the process to a step 1005 to determine whether a limited switching following acceleration condition C13 is satisfied. In this embodiment, at the step 1005, the vehicle driving assistance apparatus 10 determines whether (i) the own vehicle moving speed V1 has been smaller than the minimum permitted speed Vmin, or (ii) the inter-vehicle distance D has been greater than the maximum permitted distance Dmax.

When the limited switching following acceleration condition C13 is satisfied, the vehicle driving assistance apparatus 10 determines "Yes" at the step 1005 and proceeds with the process to a step 1010 to execute the optimum acceleration control. Then, the vehicle driving assistance apparatus 10 terminates executing the process of this routine once.

On the other hand, when the limited switching following acceleration condition C13 is not satisfied, the vehicle driving assistance apparatus 10 determines "No" at the step 1005 and proceeds with the process to a step 1015 to determine whether a limited switching following deceleration condition C14 is satisfied. In this embodiment, at the step 1015, the vehicle driving assistance apparatus 10 determines whether (i) the own vehicle moving speed V1 has been greater than the maximum permitted speed Vmax, or (ii) the inter-vehicle distance D has been smaller than the minimum permitted distance Dmin.

When the limited switching following deceleration condition C14 is satisfied, the vehicle driving assistance apparatus 10 determines "Yes" at the step 1015 and proceeds with the process to a step 1020 to execute the coasting control. Then, the vehicle driving assistance apparatus 10 terminates executing the process of this routine once.

On the other hand, when the limited switching following deceleration condition C14 is not satisfied, the vehicle driving assistance apparatus 10 determines "No" at the step 1015 and terminates executing the process of this routine once.

Further, when the second consumed energy amount EN2 is equal to or greater than the first consumed energy amount EN1 at a point of time of executing a process of the step 835 of the routine shown in FIG. 8, the vehicle driving assistance apparatus 10 determines "No" at the step 835 and proceeds with the process to a step 855 to execute the ordinary following control by executing the routine shown in FIG. 13 as described above. Then, the vehicle driving assistance apparatus 10 terminates executing the process of this routine once.

The operations of the vehicle driving assistance apparatus 10 have been described. With the vehicle driving assistance apparatus 10, even when the synchronous switching following control cannot be used to move the own vehicle 100, the non-synchronous switching following control can be used to move the own vehicle 100. Therefore, the energy efficiency of the driving apparatus 21 can be improved.

It should be noted that the invention is not limited to the aforementioned embodiments, and various modifications can be employed within the scope of the invention.

For example, the vehicle driving assistance apparatus 10 uses a condition that the moving assistance request condition C1 and the efficiency prioritizing request condition C2 are satisfied as a predetermined execution condition for determining executing the non-synchronous switching following control. In this regard, the vehicle driving assistance apparatus 10 may omit the efficiency prioritizing request condition C2 and use only a condition that the moving assistance request condition C1 is satisfied.

What is claimed is:

1. A vehicle driving assistance apparatus, comprising an electronic control unit configured to execute:
   a first following control to move an own vehicle, following a preceding vehicle by autonomously controlling acceleration and deceleration of the own vehicle so as to maintain an inter-vehicle distance between the own vehicle and the preceding vehicle within a first predetermined distance range;
   a second following control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range; and
   a third following control to move the own vehicle, following the preceding vehicle by accelerating and decelerating the own vehicle synchronously or almost synchronously with an acceleration and a deceleration of the preceding vehicle, the third following control being a control to (i) accelerate the own vehicle by an optimum acceleration control to accelerate the own vehicle by operating the driving apparatus of the own vehicle at an operation state which realizes the smallest consumed energy amount of the driving apparatus or the consumed energy amount close to the smallest consumed energy amount when the own vehicle is required to be accelerated and (ii) decelerate the own vehicle by a coasting control to coast the own vehicle when the own vehicle is required to be decelerated,
   wherein the electronic control unit is configured to:
      predict (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control;
      execute the second following control when the second consumed energy amount is smaller than the first consumed energy amount; and
      execute the first following control when the second consumed energy amount is equal to or greater than the first consumed energy amount, and
      transfer the own vehicle to behind another vehicle and execute the third following control when both conditions are met: (i) the other vehicle including a driving apparatus having the same or almost the same power output property as a power output property of the driving apparatus of the own vehicle, is detected, and (ii) the other vehicle is moved by the same control as the second following control or the third following control.

2. The vehicle driving assistance apparatus as set forth in claim 1, wherein
   the electronic control unit is configured to:
   when a predetermined execution condition that the consumed energy amount consumed by the driving apparatus of the own vehicle is requested to be reduced, becomes satisfied,
      predict changes of the inter-vehicle distance and the own vehicle moving speed as first predicted changes assuming that the first following control is executed;
      predict the first consumed energy amount corresponding to the energy amount consumed by the driving apparatus of the own vehicle assuming that the first following control is executed, based on the first predicted changes;
      predict the changes of the inter-vehicle distance and the own vehicle moving speed as second predicted changes assuming that the second following control is executed; and
      predict the second consumed energy amount corresponding to the consumed energy amount consumed by the driving apparatus of the own vehicle assuming that the second following control is executed, based on the predicted second changes.

3. The vehicle driving assistance apparatus as set forth in claim 1,
   wherein the second following control is a control to (i) decelerate the own vehicle by coasting the own vehicle when the own vehicle moving speed increases to an upper limit of the predetermined speed range and (ii) accelerate the own vehicle when the own vehicle moving speed decreases to a lower limit of the predetermined speed range, or
   wherein the second following control is a control to (i) accelerate the own vehicle when the inter-vehicle distance increases to an upper limit of the second predetermined distance range and (ii) decelerate the own vehicle by coasting the own vehicle when the inter-vehicle distance decreases to a lower limit of the second predetermined distance range.

4. The vehicle driving assistance apparatus as set forth in claim 1, wherein the second following control is a control to:
   (i) accelerate the own vehicle by an optimum acceleration control to accelerate the own vehicle by operating the driving apparatus at an operation state which realizes the smallest consumed energy amount of the driving apparatus or the consumed energy amount close to the smallest consumed energy amount when the own vehicle is required to be accelerated; and
   (ii) decelerate the own vehicle by a coasting control to coast the own vehicle when the own vehicle is required to be decelerated.

5. The vehicle driving assistance apparatus as set forth in claim 1, wherein the electronic control unit is configured to:
   acquire a range of the permitted own vehicle moving speed, depending on an environmental traffic condition on the moving own vehicle and set the acquired range of the own vehicle moving speed as the predetermined speed range; or
   acquire a range of the permitted inter-vehicle distance, depending on the environmental traffic condition on the moving own vehicle and set the acquired range of the inter-vehicle distance as the second predetermined distance range.

6. The vehicle driving assistance apparatus as set forth in claim 1, wherein the electronic control unit is configured to:
(i) predict the inter-vehicle distance and the own vehicle moving speed when executing the first following control, based on a moving speed of the preceding vehicle when executing the first following control; and
(ii) predict the inter-vehicle distance and the own vehicle moving speed when executing the second following control, based on the moving speed of the preceding vehicle when executing the second following control.

7. The vehicle driving assistance apparatus as set forth in claim 1, wherein the electronic control unit is configured to predict the first consumed energy amount and the second consumed energy amount in consideration of a size of the preceding vehicle.

8. A vehicle driving assistance method for moving an own vehicle by one of:
a first following control to move an own vehicle, following a preceding vehicle by autonomously controlling an acceleration and a deceleration of the own vehicle so as to maintain an inter-vehicle distance between the own vehicle and the preceding vehicle within a first predetermined distance range;
a second following control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range; and
a third following control to move the own vehicle, following the preceding vehicle by accelerating and decelerating the own vehicle synchronously or almost synchronously with an acceleration and a deceleration of the preceding vehicle, the third following control being a control to (i) accelerate the own vehicle by an optimum acceleration control to accelerate the own vehicle by operating the driving apparatus of the own vehicle at an operation state which realizes the smallest consumed energy amount of the driving apparatus or the consumed energy amount close to the smallest consumed energy amount when the own vehicle is required to be accelerated and (ii) decelerate the own vehicle by a coasting control to coast the own vehicle when the own vehicle is required to be decelerated,
wherein the vehicle driving assistance method comprises steps of:
predicting (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control;
executing the second following control when the second consumed energy amount is smaller than the first consumed energy amount;
executing the first following control when the second consumed energy amount is equal to or greater than the first consumed energy amount; and
transferring the own vehicle to behind another vehicle and executing the third following control when both conditions are met: (i) the other vehicle including a driving apparatus having the same or almost the same power output property as a power output property of the driving apparatus of the own vehicle, is detected, and (ii) the other vehicle is moved by the same control as the second following control or the third following control.

9. A non-transitory computer-readable storage medium storing a vehicle driving assistance program which moves an own vehicle by one of:
a first following control to move an own vehicle, following a preceding vehicle by autonomously controlling an acceleration and a deceleration of the own vehicle so as to maintain an inter-vehicle distance between the own vehicle and the preceding vehicle within a first predetermined distance range;
a second following control to move the own vehicle, following the preceding vehicle by autonomously controlling the acceleration and the deceleration of the own vehicle so as to (i) maintain an own vehicle moving speed corresponding to a moving speed of the own vehicle within a predetermined speed range or (ii) maintain the inter-vehicle distance within a second predetermined distance range greater than the first predetermined distance range; and
a third following control to move the own vehicle, following the preceding vehicle by accelerating and decelerating the own vehicle synchronously or almost synchronously with an acceleration and a deceleration of the preceding vehicle, the third following control being a control to (i) accelerate the own vehicle by an optimum acceleration control to accelerate the own vehicle by operating the driving apparatus of the own vehicle at an operation state which realizes the smallest consumed energy amount of the driving apparatus or the consumed energy amount close to the smallest consumed energy amount when the own vehicle is required to be accelerated and (ii) decelerate the own vehicle by a coasting control to coast the own vehicle when the own vehicle is required to be decelerated,
wherein the vehicle driving assistance program is configured to:
predict (i) a first consumed energy amount corresponding to a consumed energy amount consumed by a driving apparatus of the own vehicle when executing the first following control and (ii) a second consumed energy amount corresponding to the consumed energy amount consumed by the driving apparatus of the own vehicle when executing the second following control;
execute the second following control when the second consumed energy amount is smaller than the first consumed energy amount;
execute the first following control when the second consumed energy amount is equal to or greater than the first consumed energy amount; and
transfer the own vehicle to behind another vehicle and execute the third following control when both conditions are met: (i) the other vehicle including a driving apparatus having the same or almost the same power output property as a power output property of the driving apparatus of the own vehicle, is detected, and (ii) the other vehicle is moved by the same control as the second following control or the third following control.

* * * * *